US012755686B2

(12) United States Patent
Chauhan et al.

(10) Patent No.: US 12,755,686 B2
(45) Date of Patent: Oct. 6, 2026

(54) DYNAMIC DISPLAY BRIGHTNESS CONTROL USING FACIAL DETECTION VIA ALWAYS-ON CAMERA TO REDUCE SMARTPHONE POWER CONSUMPTION

(71) Applicant: QUALCOMM Incorporated, San Diego, CA (US)

(72) Inventors: Vandit Chauhan, Hyderabad (IN); Sreeharipriya Garikipati, Hyderabad (IN); Pragya Pande, Lucknow (IN); Rohit Singh, Hyderabad (IN); Ankit Kumar, Saharsa (IN); Mrinal Gupta, Tinsukia (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 18/755,196

(22) Filed: Jun. 26, 2024

(65) Prior Publication Data

US 2026/0004725 A1 Jan. 1, 2026

(51) Int. Cl.

| | |
|---|---|
| ***G06F 1/3231*** | (2019.01) |
| ***G06F 1/3234*** | (2019.01) |
| ***G06F 3/01*** | (2006.01) |
| ***G09G 3/3208*** | (2016.01) |
| *G06F 1/3215* | (2019.01) |
| *G09G 5/10* | (2006.01) |

(52) U.S. Cl.

CPC ......... *G09G 3/3208* (2013.01); *G06F 1/3231* (2013.01); *G06F 1/3265* (2013.01);
(Continued)

(58) Field of Classification Search

CPC .................. G09G 3/3208; G09G 5/10; G09G 2320/0626; G09G 2330/022;
(Continued)

(56) References Cited

U.S. PATENT DOCUMENTS

| | | | | |
|---|---|---|---|---|
| 11,227,060 | B1 * | 1/2022 | John | G06F 21/606 |
| 2005/0017994 | A1 * | 1/2005 | Oh | G09G 3/3406 345/691 |

(Continued)

OTHER PUBLICATIONS

International Search Report and Written Opinion—PCT/US2025/026865—ISA/EPO—Jul. 24, 2025.

*Primary Examiner* — Antonio Xavier
(74) *Attorney, Agent, or Firm* — NORTON ROSE FULBRIGHT US LLP

(57) ABSTRACT

Dynamically controlling the display brightness of a smartphone to reduce power consumption using facial detection via an always-on camera. The smartphone is equipped with a dedicated low-power always-on (AON) camera system that performs facial detection to determine whether the user is actively looking at the screen. When the user is not looking at the screen, the display brightness is automatically lowered to a preset level or by a percentage to reduce display power consumption. When the user's face is subsequently detected, the brightness is increased based on ambient light sensor readings. The AON camera system enables power optimization while also supporting instant face unlock, hands-free convenience features, and enhanced security. By dynamically adjusting the display brightness based on user engagement, battery life is significantly extended without compromising the user experience.

18 Claims, 10 Drawing Sheets

(52) U.S. Cl.
CPC ............ *G06F 3/011* (2013.01); *G06F 1/3215* (2013.01); *G09G 5/10* (2013.01); *G09G 2320/0626* (2013.01); *G09G 2330/022* (2013.01); *G09G 2330/023* (2013.01); *G09G 2360/141* (2013.01)

(58) Field of Classification Search
CPC ........ G09G 2330/023; G09G 2360/141; G06F 3/011; G06F 1/3231; G06F 1/3265
See application file for complete search history.

(56) References Cited

U.S. PATENT DOCUMENTS

| | | | | |
|---|---|---|---|---|
| 2006/0238531 | A1* | 10/2006 | Wang | G09G 3/20 345/211 |
| 2007/0220530 | A1* | 9/2007 | Hsieh | G06F 1/26 719/327 |
| 2010/0079508 | A1* | 4/2010 | Hodge | G06F 1/3206 345/697 |
| 2014/0075220 | A1* | 3/2014 | Song | G06F 1/3212 713/320 |
| 2015/0271392 | A1 | 9/2015 | Musgrave et al. | |
| 2015/0339046 | A1* | 11/2015 | Hegde | G06F 3/04886 715/798 |
| 2019/0340421 | A1 | 11/2019 | Boenapalli et al. | |
| 2020/0314305 | A1* | 10/2020 | Gruhlke | G03B 17/56 |
| 2021/0174047 | A1* | 6/2021 | Holland | G01N 21/31 |
| 2021/0327394 | A1 | 10/2021 | Bui et al. | |
| 2021/0349536 | A1* | 11/2021 | Crispin | A61B 3/112 |
| 2022/0147142 | A1* | 5/2022 | Bui | G06V 40/166 |
| 2022/0261084 | A1* | 8/2022 | Hong | G06F 3/012 |

* cited by examiner

900

1000

DYNAMIC DISPLAY BRIGHTNESS CONTROL USING FACIAL DETECTION VIA ALWAYS-ON CAMERA TO REDUCE SMARTPHONE POWER CONSUMPTION

TECHNICAL FIELD

This disclosure generally relates to power management in smartphone devices. More particularly, the disclosure relates to dynamically controlling display screen brightness using facial detection via an always-on camera to reduce power consumption.

DESCRIPTION OF RELATED TECHNOLOGY

Battery life is a critical factor in user satisfaction with smartphone devices. Users increasingly demand multi-day battery life from their smartphones. However, meeting this demand presents significant challenges as phones incorporate more advanced features and power-hungry components.

The display screen, particularly those utilizing active-matrix organic light-emitting diode (AMOLED) panels, is typically the largest contributor to the overall power consumption of a smartphone, accounting for approximately 30-40% of total device power. While lowering the screen brightness can significantly reduce display power consumption by up to 60%, this is not a viable solution during active use as it degrades the user experience.

Facial detection technology has been incorporated into smartphones for various purposes such as instant face unlock, hands-free convenience features, and enhanced security. This technology is typically implemented using a front-facing camera in combination with an image signal processor (ISP) executing a facial detection algorithm. Some recent smartphone designs have incorporated a low-power always-on (AON) camera system dedicated to performing facial detection even when the phone is not actively being used.

However, there is currently no solution that leverages the AON camera system and facial detection to dynamically optimize display power consumption based on whether the user is actively looking at the screen. Therefore, there is a need to utilize facial detection via an always-on camera to intelligently control the display brightness and reduce power consumption without compromising the user experience during active use of the smartphone.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for dynamic control of display screen brightness of a smartphone based on facial detection using an always-on (AON) camera system.

The method includes detecting, using the AON camera system configured to perform facial detection of a user, if the user's face is looking at the display screen. The method further includes, in response to detecting that the user's face is not looking at the display screen, automatically lowering the brightness of the display screen to reduce power consumption of the display. The method further includes, in response to subsequently detecting that the user's face is looking at the display screen, automatically increasing the brightness of the display screen based on ambient light sensor readings.

Another innovative aspect of the subject matter described in this disclosure can be implemented in an apparatus. The apparatus includes a processing system that includes processor circuitry and memory circuitry that stores code. The processing system is configured to cause the apparatus to detect, using an AON camera system configured to perform facial detection of a user, if the user's face is looking at a display screen. The processing system is further configured to cause the apparatus to, in response to detecting that the user's face is not looking at the display screen, automatically lower the brightness of the display screen to reduce power consumption of the display. The processing system is further configured to cause the apparatus to, in response to subsequently detecting that the user's face is looking at the display screen, automatically increase the brightness of the display screen based on ambient light sensor readings.

Another innovative aspect of the subject matter described in this disclosure can be implemented in a multimedia device. The multimedia device includes a display and a processing system that includes processor circuitry and memory circuitry that stores code. The processing system is configured to cause the multimedia device to detect, using an AON camera system configured to perform facial detection of a user, if the user's face is looking at the display. The processing system is further configured to cause the multimedia device to, in response to detecting that the user's face is not looking at the display, automatically lower the brightness of the display to reduce power consumption of the display. The processing system is further configured to cause the multimedia device to, in response to subsequently detecting that the user's face is looking at the display, automatically increase the brightness of the display based on ambient light sensor readings.

In some implementations, the method, apparatus, or multimedia device may lower the brightness to a preset dimmer level or a percentage. The preset dimmer level or percentage may be determined based on a user preference setting, a battery level of the device, or a combination thereof.

In some implementations, the AON camera system in the method, apparatus, or multimedia device may utilize a low-power image signal processor (ISP) to enable the facial detection, where the low-power ISP is separate from a primary ISP used for a primary camera of the device.

In some implementations, the method, apparatus, or multimedia device may further utilize the facial detection of the AON camera system to enable instant face unlock by automatically waking the device and initiating a face unlock process when the user's face is detected, to enable hands-free user convenience features by automatically keeping the display screen active while the user's face is detected, and to enhance device security by locking the device or notifying the user when an unauthorized face is detected.

In some implementations, the display screen in the method, apparatus, or multimedia device may comprise an active-matrix organic light-emitting diode (AMOLED) panel, and the power consumption of the AMOLED panel may be reduced by lowering a pixel illumination intensity when the brightness of the display screen is lowered to the preset dimmer level.

In some implementations, the AON camera system in the method, apparatus, or multimedia device may perform the facial detection of the user at a first periodic interval when the device is in a display-active state and at a second periodic interval longer than the first periodic interval when the device is in a display-inactive state to further conserve power.

Details of one or more implementations of the subject matter described in this disclosure are set forth in the accompanying drawings and the description below. Other features, aspects, and advantages will become apparent from the description, the drawings and the claims.

DESCRIPTION OF THE FIGURES

Like reference numbers and designations in the various drawings indicate like elements.

DETAILED DESCRIPTION

Figure 1:
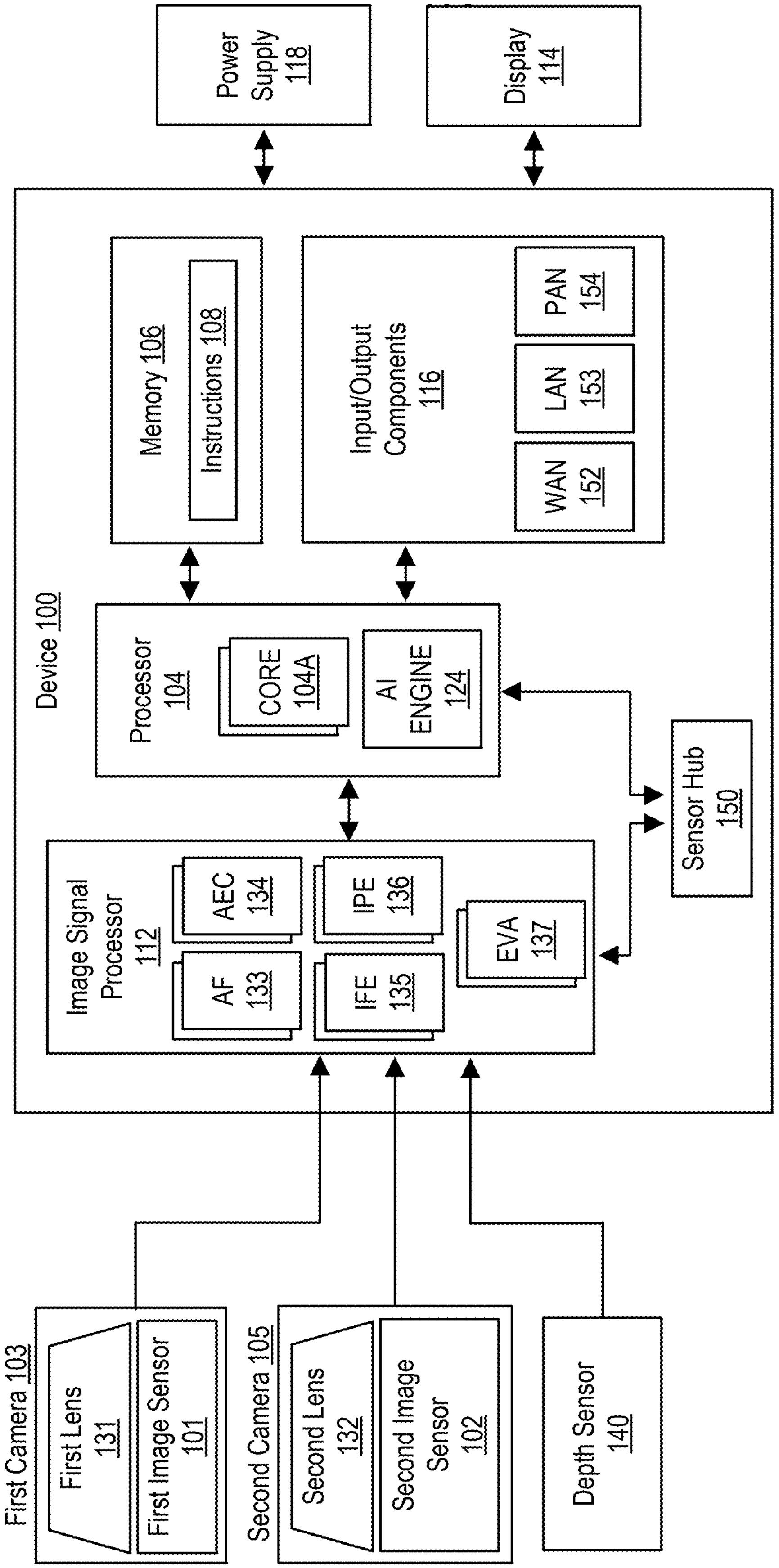
FIG. 1 is a block diagram of a device for performing image capture from one or more image sensors and dynamically controlling display screen brightness based on facial detection using an always-on (AON) camera system.

This disclosure relates to techniques for dynamically controlling the display brightness of a smartphone using facial detection via an always-on camera, with the primary goal of reducing power consumption while maintaining an optimal user experience. This is achieved by leveraging the smartphone's low-power always-on (AON) camera system to continuously monitor whether the user is actively looking at the screen and adjusting the display brightness accordingly.

According to certain aspects, when the AON camera system detects the user is not looking at the screen, display brightness is automatically lowered, e.g., to a preset dimmer level or by a certain percentage, or the like. The preset level can be determined based on user preference settings, the smartphone's battery level, or a combination thereof. By lowering the display brightness, the power consumption of the display can be reduced by up to 60%, which is significant considering that the display is often the largest power consumer in a smartphone. Conversely, when the AON camera system subsequently detects the user's face, the display brightness is increased to a level determined by ambient light sensor readings. This dynamic adjustment ensures that the display brightness is optimized based on user engagement, enabling significant power savings without compromising the user experience during active use of the smartphone.

The AON camera system can be specifically designed for low-power operation, allowing it to continuously perform facial detection without significantly impacting battery life. In some implementations, the AON camera system utilizes a dedicated low-power image signal processor (ISP) that is separate from the main ISP used for the primary camera. This architectural separation allows the facial detection functionality to operate independently of the main camera system, conserving power when the main camera is not in use. Further, the AON camera system can perform facial detection at different periodic intervals based on the display state. For example, it can perform facial detection more frequently when the display is active and less frequently when the display is inactive, further conserving power.

Beyond enabling dynamic display brightness control, the AON camera system can support various other features that enhance the user experience and device functionality. For instance, the facial detection capability can be used to implement instant face unlock, where the device automatically wakes up and initiates the face unlock process as soon as the user looks at the screen. Similarly, the AON camera system can enable hands-free user convenience features, such as keeping the display active while the user is looking at the screen. The continuous nature of the AON camera system also allows for enhanced device security, as it can detect unauthorized users and take appropriate actions like locking the device or notifying the owner.

The disclosure is not limited to any specific type of display technology and can be applied to various types of displays commonly used in smartphones, such as active-matrix organic light-emitting diode (AMOLED) or liquid crystal display (LCD) panels. However, the specific power savings achieved through dynamic brightness control may vary depending on the display technology used, as different display types have different power consumption characteristics.

Nonetheless, the general principles of this disclosure remain applicable, as the goal is to optimize the display brightness based on user engagement to reduce overall power consumption. While this disclosure is applicable to various display technologies, it can be particularly advantageous for smartphones using active-matrix organic light-emitting diode (AMOLED) panels. In AMOLED displays, each pixel is individually illuminated, allowing for more granular control over power consumption. By lowering the pixel illumination intensity when the display brightness is reduced to the preset dimmer level, the power consumption of the AMOLED panel can be further optimized.

The facial detection algorithms employed by the AON can be designed to prioritize various factors such as accuracy, speed, and power efficiency, depending on the specific requirements of the device and user preferences. In some implementations, the algorithms can be implemented using advanced machine learning techniques such as deep neural networks, which can be trained on large datasets of face images to improve detection performance. The algorithms may also be customized to detect specific user features or behaviors, such as eye gaze direction, blink frequency, or facial expressions, which can be used as additional inputs for dynamic display control or other applications. The flexibility and adaptability of the facial detection algorithms allow for a wide range of customization options to suit different device capabilities and user needs.

Particular aspects of the subject matter described in this disclosure can be implemented to realize one or more of the following potential advantages. First, the dynamic display brightness control enabled by the always-on camera system can significantly reduce the smartphone's overall power consumption, leading to extended battery life. This is particularly advantageous given that battery life is one of the most critical factors influencing user satisfaction with smartphones. By reducing the display power consumption, which is often the largest contributor to the total device power consumption, the disclosed techniques can help smartphones achieve the highly sought-after multi-day battery life. Second, the use of the always-on camera system for continuous facial detection enables a range of user convenience and security features, such as instant face unlock, hands-free operation, and enhanced device protection against unauthorized access. Third, aspects of this disclosure allow flexibility in terms of display technology as the adaptability of the facial detection algorithms allow for customization and optimization based on specific device requirements and user preferences. This adaptability ensures that the disclosed techniques can be readily applied to various smartphone models and configurations.

FIG. 1 shows a block diagram of a device 100 for performing image capture from one or more image sensors and dynamically controlling display screen brightness based on facial detection using an always-on (AON) camera system. The device 100 may include, or otherwise be coupled to, an image signal processor (e.g., ISP 112) for processing image frames from one or more image sensors, such as a first image sensor 101, a second image sensor 102, and an AON camera sensor 140. The AON camera sensor 140 is coupled to a low-power ISP 142 configured to perform facial detection of a user, separate from the primary ISP 112 used for the first image sensor 101 and second image sensor 102. In some implementations, the device 100 also includes or is coupled to a processor 104 and a memory 106 storing instructions 108 (e.g., a memory storing processor-readable code or a non-transitory computer-readable medium storing instructions). The device 100 may also include or be coupled to a display 114, which may be an active-matrix organic light-emitting diode (AMOLED) panel, and components 116. Components 116 may be used for interacting with a user, such as a touch screen interface and/or physical buttons.

Components 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna, including multiple antennas configured for primary and diversity reception and/or configured for receiving specific frequency bands. In some implementations, antennas may be shared for communicating on different networks by the WAN adaptor 152, LAN adaptor 153, and/or PAN adaptor 154. In some implementations, the WAN adaptor 152, LAN adaptor 153, and/or PAN adaptor 154 may share circuitry and/or be packaged together, such as when the LAN adaptor 153 and the PAN adaptor 154 are packaged as a single integrated circuit (IC).

The device 100 may further include or be coupled to a power supply 118 for the device 100, such as a battery or an adaptor to couple the device 100 to an energy source. The device 100 may also include or be coupled to additional features or components that are not shown in FIG. 1. In one example, a wireless interface, which may include a number of transceivers and a baseband processor in a radio frequency front end (RFFE), may be coupled to or included in WAN adaptor 152 for a wireless communication device. In a further example, an analog front end (AFE) to convert analog image data to digital image data may be coupled between the first image sensor 101, second image sensor 102, or AON camera sensor 140 and processing circuitry in the device 100. In some implementations, AFEs may be embedded in the ISP 112 or low-power ISP 142.

The device may include or be coupled to a sensor hub 150 for interfacing with sensors to receive data regarding movement of the device 100, data regarding an environment around the device 100, and/or other non-camera sensor data. One example non-camera sensor is a gyroscope, which is a device configured for measuring rotation, orientation, and/or angular velocity to generate motion data. Another example non-camera sensor is an accelerometer, which is a device configured for measuring acceleration, which may also be used to determine velocity and distance traveled by appropriately integrating the measured acceleration. In some aspects, a gyroscope in an electronic image stabilization system (EIS) may be coupled to the sensor hub. In another example, a non-camera sensor may be a global positioning system (GPS) receiver, which is a device for processing satellite signals, such as through triangulation and other techniques, to determine a location of the device 100. The location may be tracked over time to determine additional motion information, such as velocity and acceleration. The data from one or more sensors may be accumulated as motion data by the sensor hub 150. One or more of the acceleration, velocity, and/or distance may be included in motion data provided by the sensor hub 150 to other components of the device 100, including the ISP 112, low-power ISP 142, and/or the processor 104.

The ISP 112 processes image frames captured by the first camera 103 and second camera 105, while the low-power ISP 142 processes image frames captured by the AON camera sensor 140 for facial detection. The first image sensor 101 and the second image sensor 102 are configured to capture image data representing a scene in the field of view of the first camera 103 and second camera 105, respectively. In some implementations, the first camera 103 and/or second camera 105 output analog data, which is converted by an analog front end (AFE) and/or an analog-to-digital converter (ADC) in the device 100 or embedded in the ISP 112. In some implementations, the first camera 103 and/or second camera 105 output digital data. The digital image data may be formatted as one or more image frames, whether received from the first camera 103 and/or second camera 105 or converted from analog data received from the first camera 103 and/or second camera 105.

The memory 106 may include a non-transient or non-transitory computer readable medium storing computer-executable instructions as instructions 108 to perform all or a portion of one or more operations described in this disclosure, including the dynamic control of display screen brightness based on facial detection using the AON camera system. The instructions 108 may include a camera application (or other suitable application such as a messaging application) to be executed by the device 100 for photography or videography. The instructions 108 may also include other applications or programs executed by the device 100, such as an operating system and applications other than for image or video generation. Execution of the camera application, such as by the processor 104, may cause the device 100 to record images using the first camera 103 and/or second camera 105 and the ISP 112.

In some implementations, at least one of the ISP 112, low-power ISP 142, or the processor 104 executes instructions to perform various operations described herein, including dynamically controlling the display screen brightness based on facial detection using the AON camera system. For example, execution of the instructions can instruct the low-power ISP 142 to perform facial detection using image frames captured by the AON camera sensor 140. If the user's face is not detected to be looking at the display screen, the processor 104 can automatically lower the brightness of the display 114 to reduce power consumption. When the user's face is subsequently detected to be looking at the display screen, the processor 104 can automatically increase the brightness of the display 114 based on ambient light sensor readings.

The processor 104 may include one or more general-purpose processor cores 104A-N capable of executing instructions to control operation of the ISP 112, low-power ISP 142, and dynamic display brightness control. For example, the cores 104A-N may execute a camera application stored in the memory 106 that activates or deactivates the ISP 112 for capturing image frames and/or the low-power ISP 142 for facial detection. The operations of the cores 104A-N, ISP 112, and low-power ISP 142 may be based on user input. For example, a camera application executing on processor 104 may receive a user command to begin a video preview display upon which a video comprising a sequence of image frames is captured and processed from first camera 103 and/or the second camera 105 through the ISP 112 for display and/or storage, while the low-power ISP 142 performs facial detection using the AON camera sensor 140 to dynamically control the display brightness.

In some implementations, the processor 104 may include ICs or other hardware (e.g., an artificial intelligence (AI) engine such as AI engine 124 or other co-processor) to offload certain tasks from the cores 104A-N. The AI engine 124 may be used to offload tasks related to, for example, face detection and/or object recognition performed using machine learning (ML) or artificial intelligence (AI). The AI engine 124 may be referred to as an Artificial Intelligence Processing Unit (AI PU). The AI engine 124 may include hardware configured to perform and accelerate convolution operations involved in executing machine learning algorithms, such as by executing predictive models such as artificial neural networks (ANNs) (including multilayer feedforward neural networks (MLFFNN), the recurrent neural networks (RNN), and/or the radial basis functions (RBF)). The ANN executed by the AI engine 124 may access predefined training weights for performing operations on user data. The ANN may alternatively be trained during operation of the image capture device 100, such as through reinforcement training, supervised training, and/or unsupervised training. In some other implementations, the device 100 does not include the processor 104, such as when all of the described functionality is configured in the ISP 112 and low-power ISP 142.

The display 114 may include one or more suitable displays or screens allowing for user interaction and/or to present items to the user, such as a preview of the output of the first camera 103 and/or second camera 105. In some implementations, the display 114 is an active-matrix organic light-emitting diode (AMOLED) panel. The power consumption of the AMOLED panel can be reduced by lowering a pixel illumination intensity when the brightness of the display screen is lowered to the preset dimmer level based on the facial detection using the AON camera system.

The input/output (I/O) components, such as components 116, may be or include any suitable mechanism, interface, or device to receive input (such as commands) from the user and to provide output to the user through the display 114. For example, the components 116 may include (but are not limited to) a graphical user interface (GUI), a keyboard, a mouse, a microphone, speakers, a squeezable bezel, one or more buttons (such as a power button), a slider, a toggle, or a switch.

The exemplary image capture device of FIG. 1 may be operated to dynamically control the display screen brightness using facial detection with the AON camera system. The AON camera system utilizes the low-power ISP 142 to enable facial detection, separate from the primary ISP 112 used for the first camera 103 and second camera 105. The facial detection can also be used to enable instant face unlock by automatically waking the device 100 and initiating a face unlock process when the user's face is detected. The AON camera system can enable hands-free user convenience features by automatically keeping the display screen active while the user's face is detected, and enhance device security by locking the device 100 or notifying the user when an unauthorized face is detected. The AON camera system can perform the facial detection at a first periodic interval when the device 100 is in a display-active state and at a second periodic interval longer than the first periodic interval when the device 100 is in a display-inactive state to further conserve power.

Figure 2:
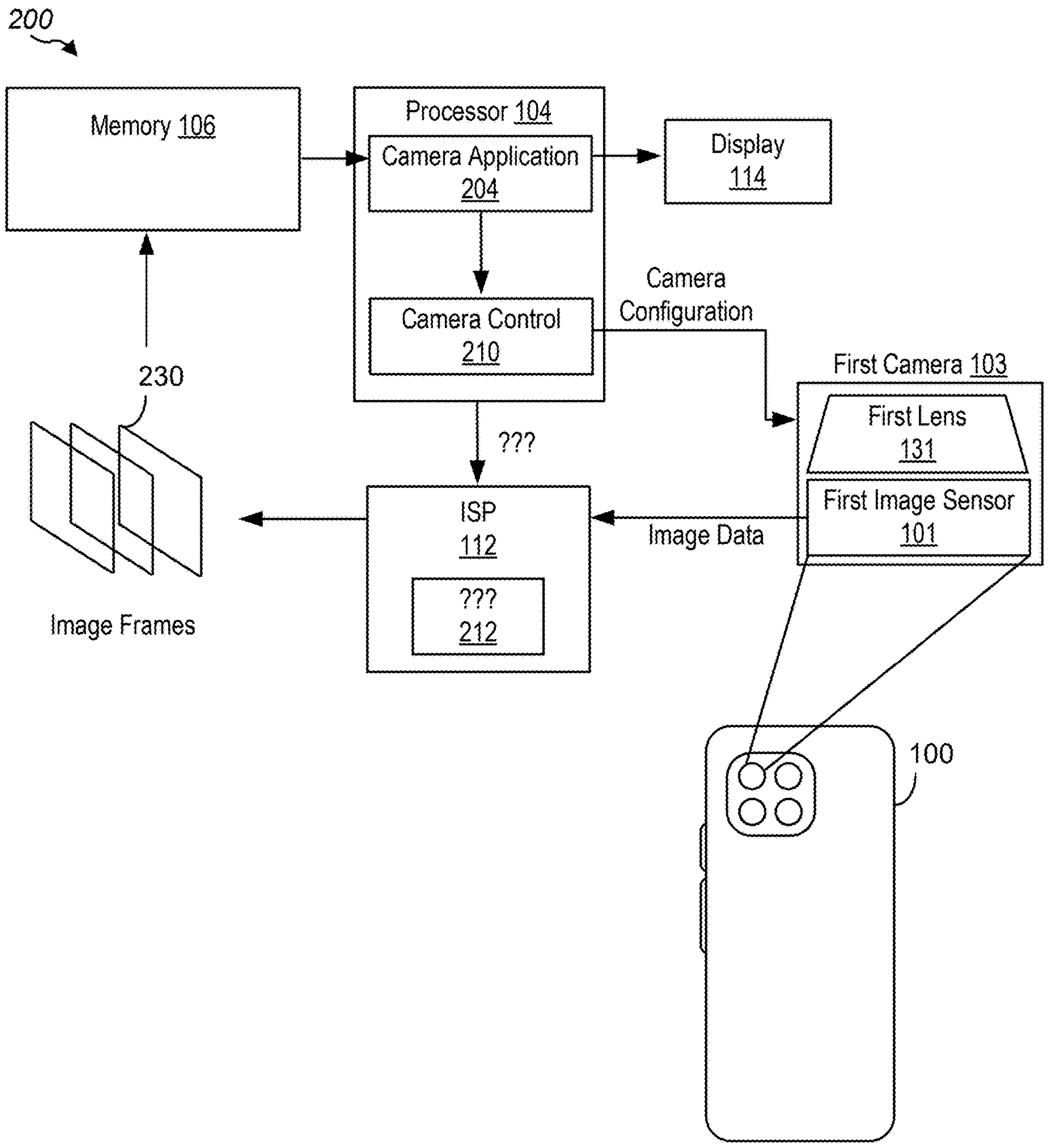
FIG. 2 is a block diagram illustrating an example data flow path for image data processing in an image capture device according to one or more implementations of the disclosures.

FIG. 2 is a block diagram illustrating an example data flow path for image data processing in an image capture device according to one or more implementations of the disclosures. Processor 104 of system 200 may communicate with ISP 112 and low-power ISP 142 through a bi-directional bus and/or separate control and data lines. The processor 104 may control the first camera 103, second camera 105, and AON camera sensor 140 through camera control 210. The camera control 210 may be a camera driver executed by the processor 104 for configuring the cameras, such as to activate or deactivate image capture, configure exposure settings, and/or configure aperture size. Camera control 210 may be managed by a camera application 204 executing on the processor 104. The camera application 204 provides settings accessible to a user such that a user can specify individual camera settings or select a profile with corresponding camera settings. Camera control 210 communicates with the cameras to configure them in accordance with commands received from the camera application 204. The camera application 204 may be, for example, a photography application, a document scanning application, a messaging application, or other application that processes image data acquired from the cameras.

The camera configuration may include parameters that specify, for example, a frame rate, an image resolution, a readout duration, an exposure level, an aspect ratio, an aperture size, etc. The cameras may apply the camera configuration and obtain image data representing a scene using the camera configuration. In some implementations, the camera configuration may be adjusted to obtain different representations of the scene. For example, the processor 104 may execute a camera application 204 to instruct the first camera 103, through camera control 210, to set a first camera configuration for the first camera 103, to obtain first image data from the first camera 103 operating in the first camera configuration, to instruct the first camera 103 to set a second camera configuration for the first camera 103, and to obtain second image data from the first camera 103 operating in the second camera configuration.

In some implementations in which the first camera 103 is a variable aperture (VA) camera system, the processor 104 may execute a camera application 204 to instruct the first camera 103 to configure to a first aperture size, obtain first image data from the first camera 103, instruct the first camera 103 to configure to a second aperture size, and obtain second image data from the first camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 corresponds to a larger aperture size than f/8.0.

The image data received from the first camera 103 and second camera 105 may be processed in one or more blocks of the ISP 112 to determine output image frames 230 that may be stored in memory 106 and/or otherwise provided to the processor 104. The image data received from the AON camera sensor 140 may be processed in the low-power ISP 142 to perform facial detection. The processor 104 may further process the image data to apply effects to the output image frames 230. Effects may include Bokeh, lighting, color casting, and/or high dynamic range (HDR) merging. In some implementations, the effects may be applied in the ISP 112.

The output image frames 230 by the ISP 112 may include representations of the scene improved by aspects of this disclosure, such that the dynamic display brightness control 212 in the processor 104 can adjust the brightness of the display 114 based on the facial detection performed by the low-power ISP 142. The processor 104 may display these output image frames 230 to a user, and the improvements provided by the described processing implemented in the ISP 112, low-power ISP 142, and/or processor 104 improve the user experience by reducing the display power consumption when the user is not looking at the screen. For example, the dynamic display brightness control 212 in the processor 104 may lower the brightness of the display 114 when the facial detection performed by the low-power ISP 142 indicates that the user's face is not looking at the display 114, and increase the brightness of the display 114 based on ambient light sensor readings when the user's face is subsequently detected to be looking at the display 114.

The system 200 of FIG. 2 may be configured to perform the operations described with reference to other Figures to dynamically control the display screen brightness based on facial detection using the AON camera system. Some Figures, for example, shows a flow chart of an example method for processing image data to perform dynamic display brightness control according to some implementations of the disclosure. The capturing and processing in other Figures may obtain an improved user experience by reducing display power consumption when the user is not looking at the screen. Each of the operations described with reference to other Figures may be performed by one or a combination of the processor 104 (including cores 104A-N or AI engine 124), the ISP 112, and/or the low-power ISP 142.

The facial detection may be performed by the low-power ISP 142 at a first periodic interval when the device is in a display-active state and at a second periodic interval longer than the first periodic interval when the device is in a display-inactive state to further conserve power. The facial detection may also be used to enable instant face unlock by automatically waking the device and initiating a face unlock process when the user's face is detected, enable hands-free user convenience features by automatically keeping the display screen active while the user's face is detected, and enhance device security by locking the device or notifying the user when an unauthorized face is detected.

The dynamic display brightness control 212 in the processor 104 may determine the preset dimmer level based on a user preference setting, a battery level of the device, or a combination thereof. When lowering the brightness of the display 114 to the preset dimmer level, the dynamic display brightness control 212 may reduce the power consumption of the display 114 by lowering a pixel illumination intensity of the AMOLED panel.

Figure 3:
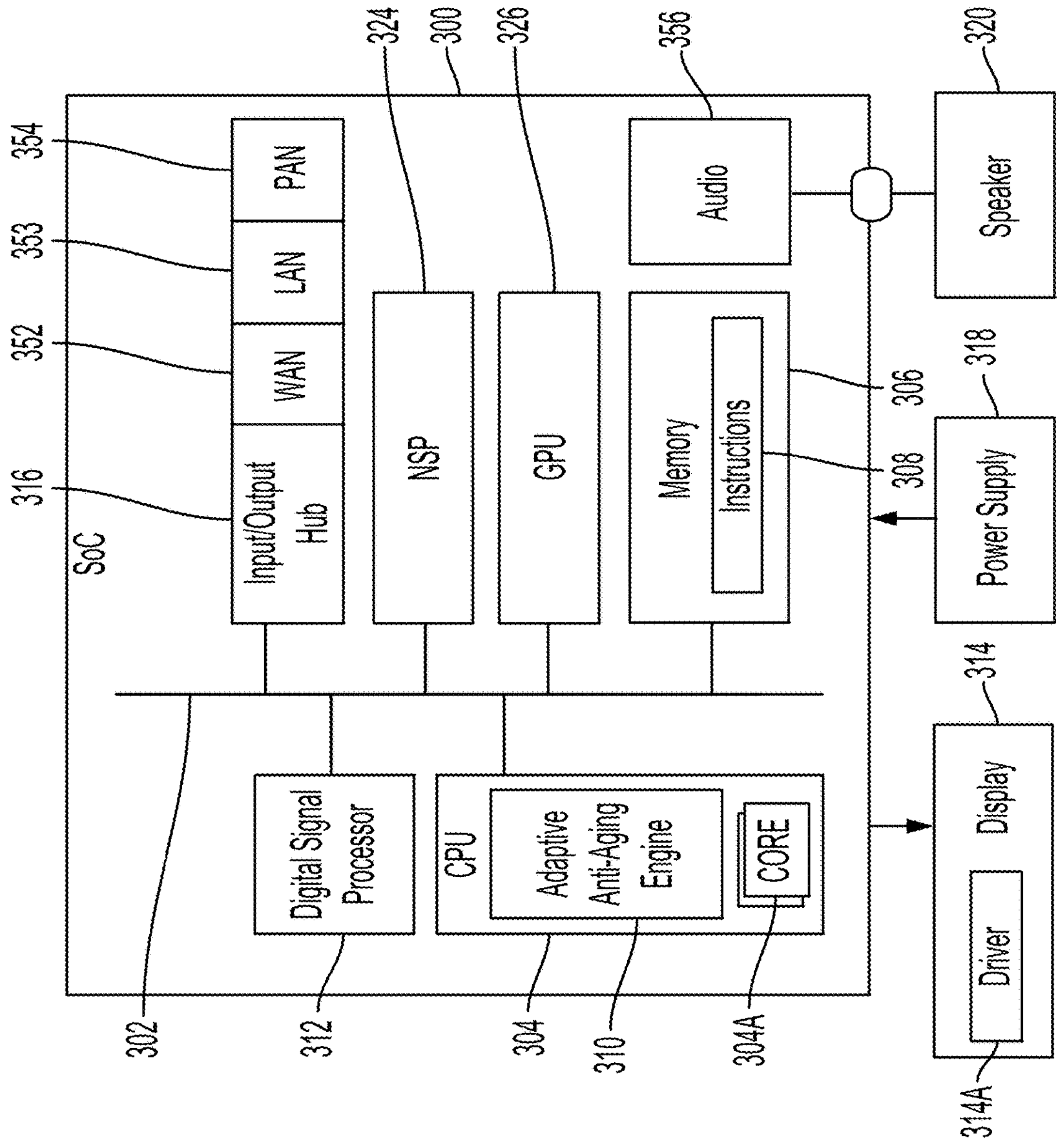
FIG. 3 is a block diagram of an example system-on-chip (SoC) configured for operating a display and performing dynamic display brightness control based on facial detection using an always-on (AON) camera system.

FIG. 3 shows a block diagram of an example system-on-chip (SoC) configured for operating a display and performing dynamic display brightness control based on facial detection using an always-on (AON) camera system. The SoC 300 may include several components coupled together through a bus 302, which may be a network-on-a-chip (NoC) or a plurality of NOCs interconnecting various components. For example, although FIG. 3 illustrates several components coupled to the bus 302, the several components may be coupled to different busses with additional busses connecting the different busses to provide a path for communication between the components.

One example component in the SoC 300 is a digital signal processor (DSP) 312 for signal processing. The DSP 312 may include hardware customized for performing a limited set of operations on specific kinds of data, such as image data from the AON camera system for facial detection. For example, the DSP 312 may include transistors coupled together to perform operations on streaming image data from the AON camera system and use memory architectures or access techniques to fetch multiple data or instructions concurrently. Such configurations may allow the DSP 312 to operate on real-time image data for facial detection in a power-efficient manner.

The SoC 300 also includes a central processing unit (CPU) 304 and a memory 306 storing instructions 308 (such as a memory storing processor-readable code or a non-transitory computer-readable medium storing instructions) that may be executed by a processor of the SoC 300. The CPU 304 may be a single central processing unit (CPU) or a CPU cluster including two or more cores such as core 304A. The CPU 304 may include hardware capable of performing generic operations on many kinds of data, such as hardware capable of executing instructions from the Advanced RISC Machines (ARM®) instruction set, such as ARMv8 and ARMv9. For example, the CPU 304 may include transistors coupled together to perform operations for supporting executing an operating system and user applications (such as a camera application, a multimedia application, a gaming application, a productivity application, a messaging application, a videocall application, an audio recording application, a video recording application). The CPU 304 may execute instructions 308 retrieved from the memory 306, such as instructions for performing dynamic display brightness control based on facial detection using the AON camera system. In some implementations, the CPU 304 executing an operating system may coordinate execution of instructions by various components within the SoC 300. For example, the CPU 304 may retrieve instructions 308 from memory 306 and execute the instructions on the DSP 312 for performing facial detection using the AON camera system.

The SoC 300 may further include a neural signal processor (NSP) 324 for executing machine learning (ML) models relating to facial detection using the AON camera system. The NSP 324 may include hardware configured to perform and accelerate convolution operations involved in executing machine learning algorithms for facial detection. For example, the NSP 324 may improve performance when executing predictive models such as artificial neural networks (ANNs) (including multilayer feedforward neural networks (MLFFNN), the recurrent neural networks (RNN), or the radial basis functions (RBF)) for facial detection. The ANN executed by the NSP 324 may access predefined training weights stored in the memory 306 for performing facial detection on image data from the AON camera system.

The SoC 300 may be coupled to a display 314 for interacting with a user. The display 314 may be controlled by a driver 314A, such as shown in and described with reference to FIG. 2, which is another example of a processor. The driver 314A may be an application specific integrated circuit (ASIC) configured to perform dynamic display brightness control based on facial detection using the AON camera system. In some implementations, the display 314 may be an active-matrix organic light-emitting diode (AMOLED) panel, and the driver 314A may be configured to lower the brightness of the display 314 by reducing a pixel illumination intensity of the AMOLED panel when the facial detection using the AON camera system indicates that the user's face is not looking at the display 314. The SoC 300 also may include a graphics processing unit (GPU) 326 for rendering images on the display 314. In some implementations, the CPU 304 may perform rendering to the display 314 without a GPU 326. In some implementations, the GPU 326 may be configured to execute instructions for performing operations unrelated to rendering images, such as for processing large volumes of datasets in parallel.

Processing algorithms, techniques, and methods that are described herein for dynamic display brightness control based on facial detection using the AON camera system may be executed by at least one processor of the SoC 300, which may include execution by all steps on one of the processors (such as DSP 312, CPU 304, NSP 324, GPU 326) or may include execution of steps across a combination of one or more of the processors (such as DSP 312, CPU 304, NSP 324, GPU 326, driver 314A). In some implementations, at least one of the driver 314A, the GPU 326, or the CPU 304 executes instructions to perform various operations described herein. To illustrate, in some implementations, the CPU 304 may include or may execute a dynamic display brightness control engine 330 to perform one or more operations described herein. In some other implementations, operations described with reference to the dynamic display brightness control engine 330 may be performed by one or more other components illustrated in FIG. 3, such as one or more of the driver 314A, the GPU 326, the DSP 312, or the NSP 324.

Input/output components may be coupled to the SoC 300 through an input/output (I/O) hub 316. An example of a hub 316 is an interconnect to a peripheral component interconnect express (PCIe) bus. Example components coupled to hub 316 may be components used for interacting with a user, such as a touch screen interface or physical buttons. Some components coupled to hub 316 also may include network interfaces for communicating with other devices, including a wide area network (WAN) adaptor (such as WAN adaptor 352), a local area network (LAN) adaptor (such as LAN adaptor 153), or a personal area network (PAN) adaptor (such as PAN adaptor 354). A WAN adaptor 352 may be a 4G LTE or a 5G NR wireless network adaptor. A LAN adaptor 353 may be an IEEE 802.31 WiFi wireless network adapter. A PAN adaptor 154 may be a Bluetooth wireless network adaptor. Each of the WAN adaptor 352, LAN adaptor 353, or PAN adaptor 354 may be coupled to an antenna that may be shared by each of the adaptors 352, 153, and 354, or coupled to multiple antennas configured for primary and diversity reception or configured for receiving specific frequency bands. In some implementations, the WAN adaptor 352, LAN adaptor 353, or PAN adaptor 354 may share circuitry, such as portions of a radio frequency front end (RFFE).

Audio circuitry 356 may be integrated in SoC 300 as dedicated circuitry for coupling the SoC 300 to a speaker 320 external to the SoC 300, which may be a transducer such as a speaker (either internal to or external to a device incorporating the SoC 300) or headphones. The audio circuitry 156 may include coder/decoder (CODEC) functionality for processing digital audio signals. The audio circuitry 156 may further include one or more amplifiers (such as a class-D amplifier) for driving a transducer coupled to the SoC 300 for outputting sounds generated during execution of applications by the SoC 300.

The SoC 300 may couple to external devices outside the package of the SoC 300. For example, the SoC 300 may be coupled to a power supply 318, such as a battery or an adaptor to couple the SoC 300 to an energy source. The signal processing described herein for dynamic display brightness control based on facial detection using the AON camera system may be adapted to and achieve power efficiency to support operation of the SoC 300 from a limited-capacity power supply 318 such as a battery. For example, the dynamic display brightness control may be performed on the DSP 312 or NSP 324, which may be configured for performing the operation at a lowest power consumption. As another example, the dynamic display brightness control may be performed in a manner that reduces a number of computations to perform the operation, such that the algorithm is optimized for extending the operational time of a device while powered by a limited-capacity power supply 318. In some implementations, the dynamic display brightness control may be configured based on a type of power supply 318 providing energy to the SoC 300. For example, a first set of operations may be executed to perform the dynamic display brightness control when the power supply 318 is a wall adaptor. As another example, a second set of operations may be executed to perform the dynamic display brightness control when the power supply 318 is a battery.

The SoC 300 also may include or be coupled to additional features or components that are not shown in FIG. 3, such as the AON camera system for performing facial detection. Although components are shown integrated as a single SoC 300, which may include all components built on a single semiconductor die with a common semiconductor substrate, other arrangements of the illustrated blocks different number of dies, substrates, or packages may be arranged to accomplish the same functionality described in this disclosure.

The memory 306 may include a non-transient or non-transitory computer readable medium storing computer-executable instructions as instructions 308 to perform all or a portion of one or more operations described in this disclosure, such as dynamic display brightness control based on facial detection using the AON camera system. The instructions 308 may include a multimedia application (or other suitable application such as a messaging application that may display multimedia content or otherwise influence the output of the display 314) to be executed by the SoC 300 that records, processes, or outputs video signals. The instructions 308 also may include other applications or programs executed by the SoC 300, such as an operating system and applications other than for multimedia processing.

While the SoC 300 is referred to in the examples herein for performing aspects of this disclosure, some device components may not be shown in FIG. 3 to prevent obscuring aspects of this disclosure. Additionally, other components, numbers of components, or combinations of components may be included in a suitable device for performing aspects of this disclosure. As such, this disclosure is not limited to a specific device or configuration of components, including the SoC 300.

Figure 4:
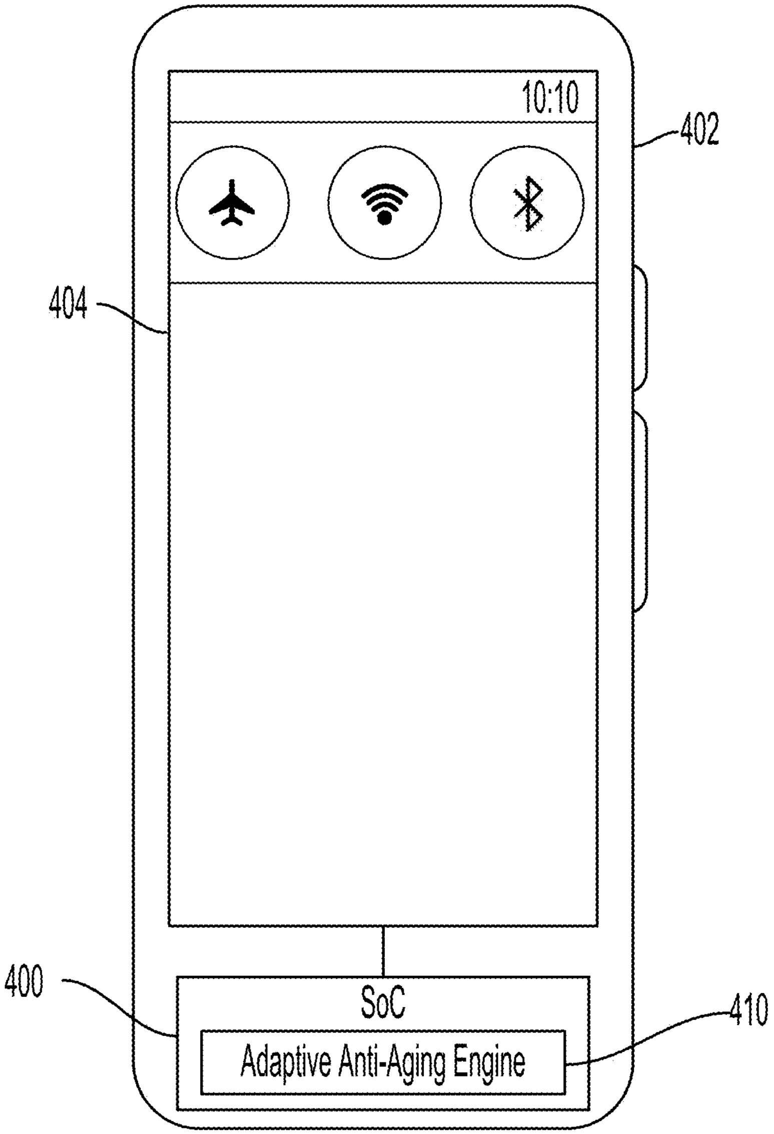
FIG. 4 is a diagram of an example mobile device, such as a smartphone, including a display.

FIG. 4 shows a diagram of an example mobile device 402, such as a smartphone, including a display 404. The mobile device 402 may include an always-on (AON) camera system for performing facial detection of a user. Additionally, one or more components of the SoC 300 may be integrated in the mobile device 402. For example, the mobile device 402 may include the SoC 300 including the dynamic display brightness control engine 330 for adjusting the brightness of the display 404 based on the facial detection using the AON camera system.

The AON camera system in the mobile device 402 may utilize a low-power image signal processor (ISP), such as the DSP 312, to enable the facial detection. The low-power ISP may be separate from a primary ISP used for a primary camera of the mobile device 402. The AON camera system may perform the facial detection at a first periodic interval when the mobile device 402 is in a display-active state and at a second periodic interval longer than the first periodic interval when the mobile device 402 is in a display-inactive state to further conserve power.

The facial detection using the AON camera system in the mobile device 402 may also be used to enable instant face unlock by automatically waking the mobile device 402 and initiating a face unlock process when the user's face is detected, enable hands-free user convenience features by automatically keeping the display 404 active while the user's face is detected, and enhance device security by locking the mobile device 402 or notifying the user when an unauthorized face is detected.

The dynamic display brightness control engine 330 in the SoC 300 of the mobile device 402 may determine a preset dimmer level for lowering the brightness of the display 404 based on a user preference setting, a battery level of the mobile device 402, or a combination thereof. When lowering the brightness of the display 404 to the preset dimmer level, the dynamic display brightness control engine 330 may reduce the power consumption of the display 404 by lowering a pixel illumination intensity of an active-matrix organic light-emitting diode (AMOLED) panel in the display 404.

The mobile device 402 may further include a power supply, such as a battery, for providing power to the SoC 300 and other components of the mobile device 402. The dynamic display brightness control based on facial detection using the AON camera system may be adapted to achieve power efficiency and extend the battery life of the mobile device 402. For example, the dynamic display brightness control may be performed by the DSP 312 or NSP 324 in the SoC 300, which may be configured for performing the operation at a lowest power consumption. As another example, the dynamic display brightness control may be performed in a manner that reduces a number of computations to perform the operation, such that the algorithm is optimized for extending the operational time of the mobile device 402 while powered by the battery.

While the mobile device 402 is referred to in the examples herein for performing aspects of this disclosure, some device components may not be shown in FIG. 4 to prevent obscuring aspects of this disclosure. Additionally, other components, numbers of components, or combinations of components may be included in a suitable mobile device for performing aspects of this disclosure. As such, this disclosure is not limited to a specific mobile device or configuration of components, including the mobile device 402.

Figure 5:
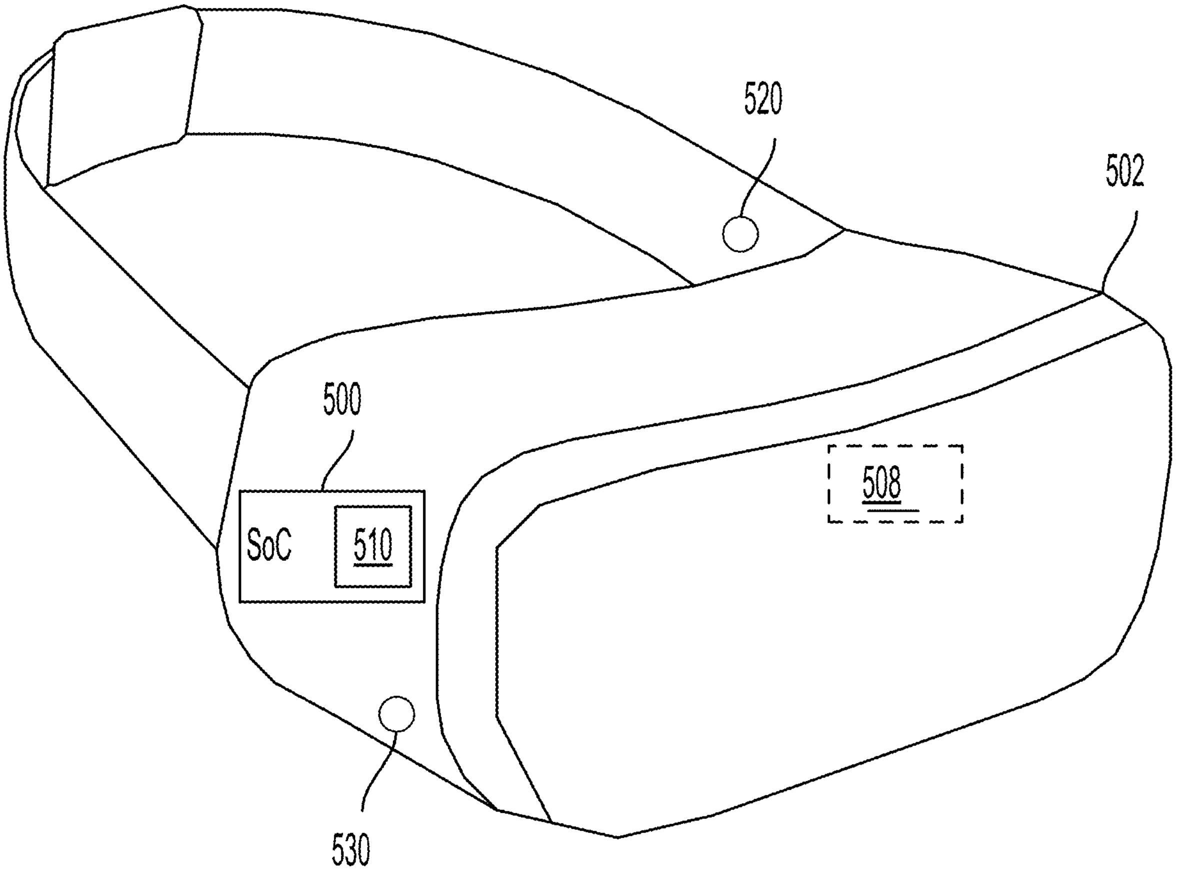
FIG. 5 is a diagram of an example headset device, such as a virtual reality, mixed reality, or augmented reality headset, that includes a display.

FIG. 5 shows a diagram of an example headset device 502, such as a virtual reality, mixed reality, or augmented reality headset, that includes a display 508. The headset device 502 includes the display 408, microphone(s) 530 and speaker(s) 520. Additionally, components of the SoC 100 or driver 114A may be integrated in the headset device 402. To illustrate, the example headset of FIG. 4 may include the SoC 100 including the adaptive anti-aging engine 110.

FIG. 5 shows a diagram of an example headset device 502, such as a virtual reality, mixed reality, or augmented reality headset, that includes a display 508. The headset device 502 includes the display 508, microphone(s) 530, speaker(s) 520, and an always-on (AON) camera system for performing facial detection of a user. Additionally, components of the SoC 300 or driver 314A may be integrated into the headset device 502. To illustrate, the example headset of FIG. 5 may include the SoC 300 with the dynamic display brightness control engine 330 for adjusting the brightness of the display 508 based on the facial detection using the AON camera system.

The AON camera system in the headset device 502 may utilize a low-power image signal processor (ISP), such as the DSP 312, to enable the facial detection. The low-power ISP may be separate from a primary ISP used for other camera functionalities in the headset device 502. The AON camera system may perform the facial detection at a first periodic interval when the headset device 502 is in a display-active state and at a second periodic interval longer than the first periodic interval when the headset device 502 is in a display-inactive state to further conserve power.

The facial detection using the AON camera system in the headset device 502 may also be used to enable instant user recognition by automatically waking the headset device 502 and initiating a user profile loading process when the user's face is detected, enable hands-free user interaction features by automatically keeping the display 508 active while the user's face is detected, and enhance device security by locking the headset device 502 or notifying the user when an unauthorized face is detected.

The dynamic display brightness control engine 330 in the SoC 300 of the headset device 502 may determine a preset dimmer level for lowering the brightness of the display 508 based on a user preference setting, a battery level of the headset device 502, or a combination thereof. When lowering the brightness of the display 508 to the preset dimmer level, the dynamic display brightness control engine 330 may reduce the power consumption of the display 508 by lowering a pixel illumination intensity of an active-matrix organic light-emitting diode (AMOLED) panel in the display 508.

The headset device 502 may further include a power supply, such as a battery, for providing power to the SoC 300 and other components of the headset device 502. The dynamic display brightness control based on facial detection using the AON camera system may be adapted to achieve power efficiency and extend the battery life of the headset device 502. For example, the dynamic display brightness control may be performed by the DSP 312 or NSP 324 in the SoC 300, which may be configured for performing the operation at a lowest power consumption. As another example, the dynamic display brightness control may be performed in a manner that reduces a number of computations to perform the operation, such that the algorithm is optimized for extending the operational time of the headset device 502 while powered by the battery.

While the headset device 502 is referred to in the examples herein for performing aspects of this disclosure, some device components may not be shown in FIG. 5 to prevent obscuring aspects of this disclosure. Additionally, other components, numbers of components, or combinations of components may be included in a suitable headset device for performing aspects of this disclosure. As such, this disclosure is not limited to a specific headset device or configuration of components, including the headset device 502.

Figure 6:
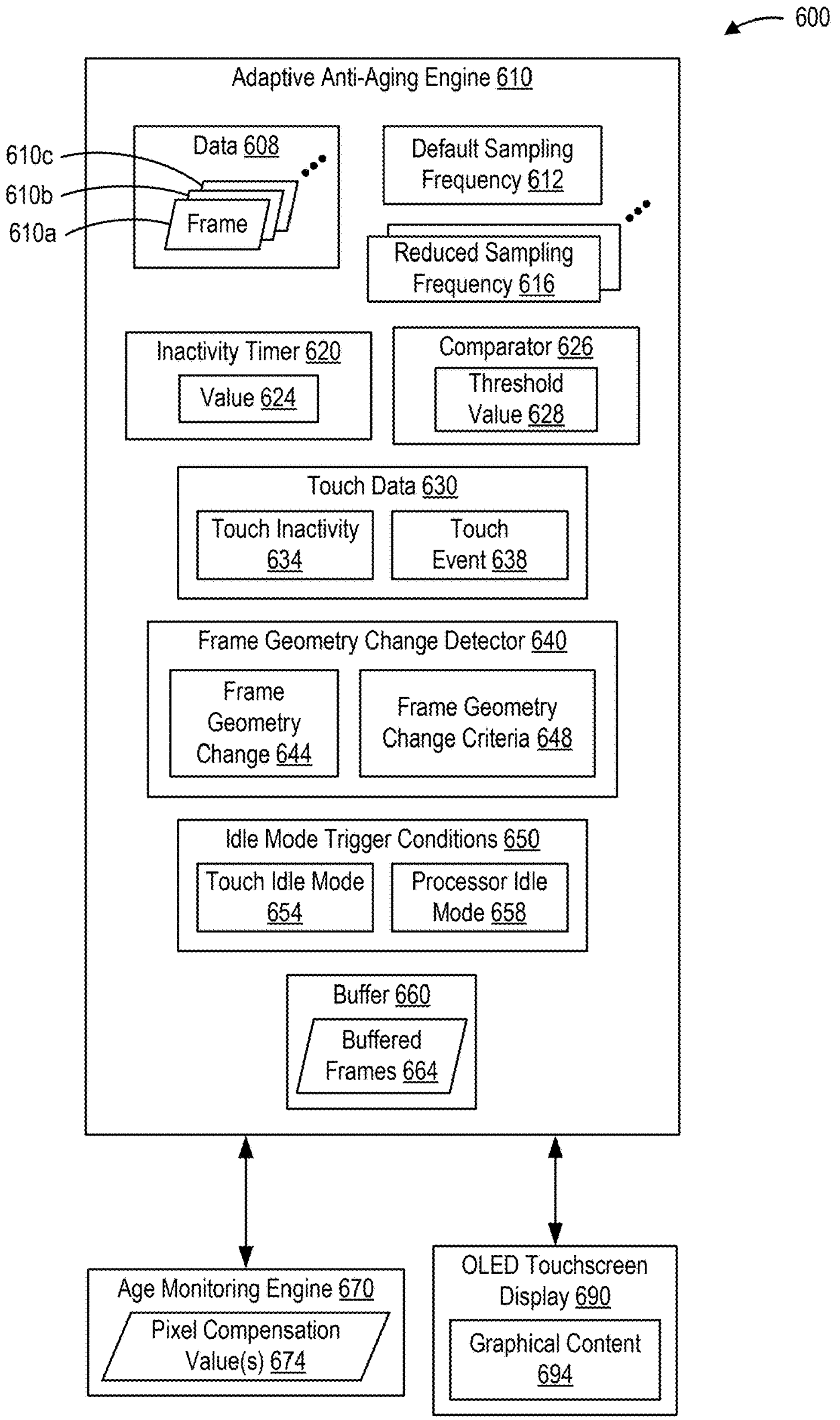
FIG. 6 is a diagram of an example system that supports dynamic display brightness control based on facial detection using an always-on (AON) camera system.

FIG. 6 shows a diagram of an example system 600 that supports dynamic display brightness control based on facial detection using an always-on (AON) camera system. The system 600 may include a dynamic display brightness control engine 610, a facial detection engine 670, and a display, such as an active-matrix organic light-emitting diode (AMOLED) touchscreen display 690. In some examples, the AMOLED touchscreen display 690 may correspond to the display 114, the display 314, the display 404, the display 508, or another display.

The AMOLED touchscreen display 690 may include a touch panel and AMOLED pixel elements. The touch panel may include a resistive touch panel, a capacitive touch panel, a surface acoustic wave (SAW) touch panel, or another type of touch panel.

In some implementations, the system 600 may be included in a computing device, such as a smartphone, a tablet, a laptop, or a wearable device such as a virtual reality, augmented reality, or mixed reality headset. Other examples are also within the scope of the disclosure. For example, in some implementations, the system 600 may be included in a vehicle, such as within a vehicle navigation system or a vehicle entertainment system. In another example, the system 600 may be included in a television or in another device.

The dynamic display brightness control engine 610 may include or may access a buffer 660, such as a frame buffer. The buffer 660 may be coupled to or may be accessible by the facial detection engine 670. In some examples, the facial detection engine 670 may correspond to a low-power image signal processor (ISP), such as the DSP 312 or the NSP 324 of FIG. 3.

During operation, the dynamic display brightness control engine 610 may perform operations associated with image data 608 captured by the AON camera system. The image data 608 may correspond to or may be associated with the user's face in relation to the AMOLED touchscreen display 690. For example, the image data 608 may include one or more frames, such as a first frame 610*a*, a second frame 610*b*, and a third frame 610*c*. In some implementations, each frame of the image data 608 may represent the user's face at a particular point in time.

According to aspects, the dynamic display brightness control engine 610 may periodically sample and analyze frames of the image data 608 to detect whether the user's face is looking at the AMOLED touchscreen display 690. The dynamic display brightness control engine 610 may select one or more first frames of the image data 608 in accordance with a first sampling frequency, such as a default sampling frequency 612. In an illustrative example, the dynamic display brightness control engine 610 may sample the first frame 610*a* in accordance with the default sampling frequency 612 and may store the first frame 610*a* to the buffer 660.

The default sampling frequency 612 may be selected, for example, based on a display-active state of the AMOLED touchscreen display 690. In such examples, the dynamic display brightness control engine 610 may "default" to the default sampling frequency 612 and may record frames of the image data 608 to the buffer 660 in accordance with the default sampling frequency 612. To further illustrate, if the default sampling frequency 612 corresponds to 10 hertz (Hz), then the dynamic display brightness control engine 610 may store a frame of the image data 608 to the buffer 660 ten times per second.

The dynamic display brightness control engine 610 may store the sampled frames to the buffer 660 as buffered frames 664 and may provide the buffered frames 664 from the buffer 660 to the facial detection engine 670. The facial detection engine 670 may analyze the buffered frames 664 to detect the presence and orientation of the user's face in relation to the AMOLED touchscreen display 690. The facial detection engine 670 may use techniques such as histogram analysis, pattern recognition, or machine learning algorithms to detect the user's face and determine whether the user is looking at the AMOLED touchscreen display 690.

The dynamic display brightness control engine 610 may adaptively change a sampling frequency associated with sampling frames of the image data 608 to the buffer 660. For example, the dynamic display brightness control engine 610 may detect a display-inactive state of the AMOLED touchscreen display 690 and, in response, may begin storing frames of the image data 608 to the buffer 660 in accordance with a second sampling frequency, such as a reduced sampling frequency 616. In an illustrative example, the dynamic display brightness control engine 610 may sample the second frame 610*b* in accordance with the reduced sampling frequency 616 and may store the second frame 610*b* to the buffer 660. The reduced sampling frequency 616 may be less than the default sampling frequency 612. To illustrate, if the reduced sampling frequency 616 corresponds to 1 hertz (Hz), then the dynamic display brightness control engine 610 may store a frame of the image data 608 to the buffer 660 once per second. This reduced sampling frequency during display-inactive states helps to conserve power.

The dynamic display brightness control engine 610 may detect a transition from the display-inactive state to the display-active state based on various trigger conditions, such as a touch event 638 associated with the AMOLED touchscreen display 690 or a change in the image data 608 satisfying certain criteria 648, such as a change in the user's face orientation or presence. In response to detecting the transition to the display-active state, the dynamic display brightness control engine 610 may return to sampling the image data 608 according to the default sampling frequency 612. In an illustrative example, the dynamic display brightness control engine 610 may sample the third frame 610*c* in accordance with the default sampling frequency 612 and may store the third frame 610*c* to the buffer 660.

Based on the facial detection results from the facial detection engine 670, the dynamic display brightness control engine 610 may determine and apply an appropriate display brightness level for the AMOLED touchscreen display 690. If the facial detection engine 670 detects that the user's face is not looking at the AMOLED touchscreen display 690, the dynamic display brightness control engine 610 may lower the brightness of the AMOLED touchscreen display 690 to, e.g., a preset dimmer level or by a percentage, to reduce power consumption. The preset dimmer level or percentage may be determined based on factors such as user preferences or battery level. When lowering the brightness, the dynamic display brightness control engine 610 may reduce the power consumption of the AMOLED touchscreen display 690 by lowering a pixel illumination intensity of the AMOLED panel.

In contrast, if the facial detection engine 670 detects that the user's face is looking at the AMOLED touchscreen display 690, the dynamic display brightness control engine 610 may set the brightness of the AMOLED touchscreen display 690 based on ambient light sensor readings to provide an optimal viewing experience for the user.

The dynamic display brightness control engine 610 may also apply gradual transitions between different brightness levels to minimize visual artifacts and user distraction. For example, the dynamic display brightness control engine 610 may slowly ramp the brightness up or down over multiple frames when transitioning between brightness levels.

The dynamic display brightness control engine 610 also may detect one or more idle mode trigger conditions 660, such as a display idle mode 654 associated with the AMOLED touchscreen display 690 or a processor idle mode 658 associated with a processor (such as the CPU 304, the DSP 312, the NSP 324, or the GPU 326 of FIG. 3). The dynamic display brightness control engine 610 may provide the buffered frames 664 from the buffer 660 to the facial detection engine 670 in accordance with detecting the one or more idle mode trigger conditions 660, allowing the facial detection and dynamic display brightness control to be performed opportunistically during idle periods to further conserve power.

Figure 7:
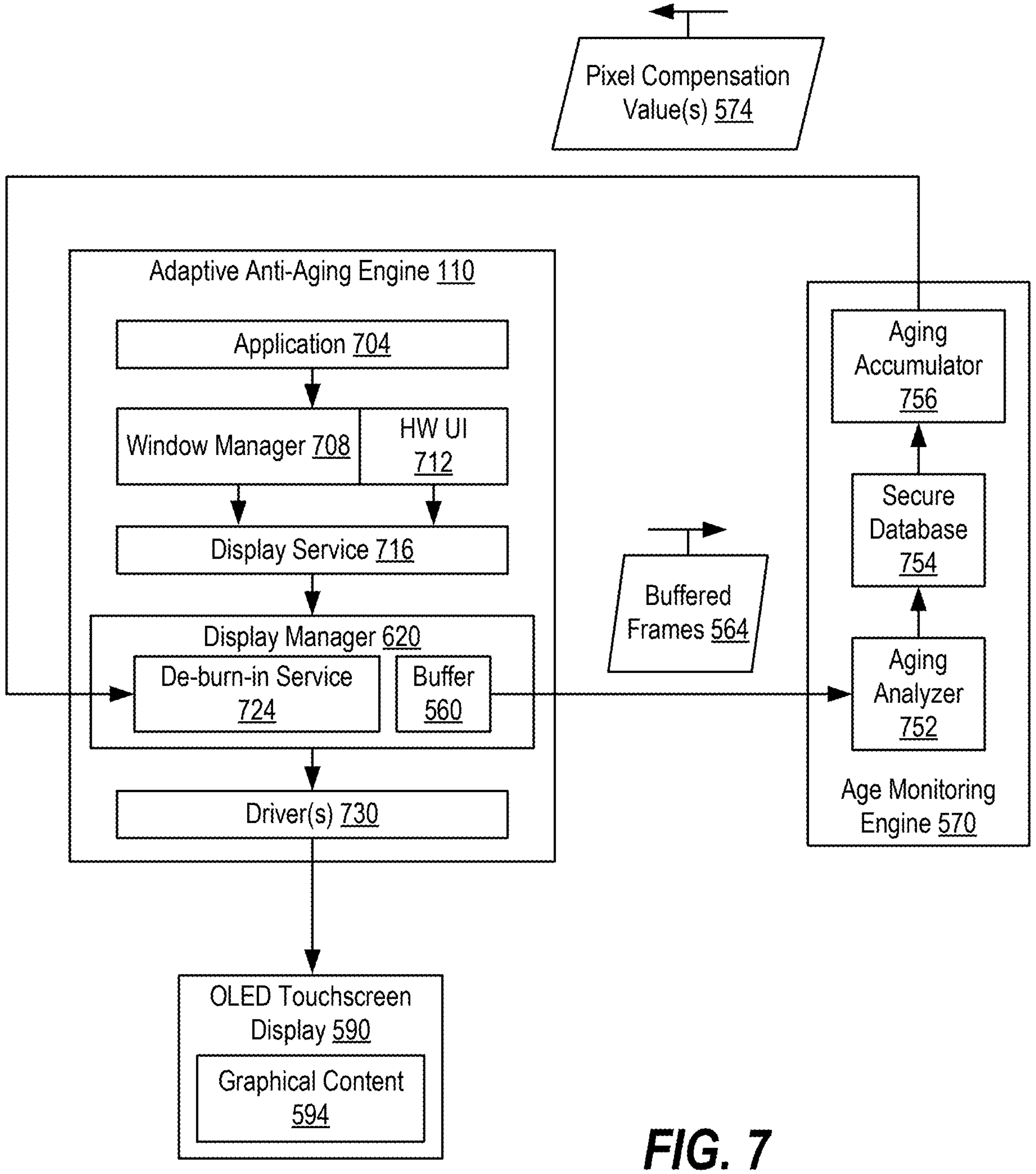
FIG. 7 is a diagram illustrating some example features of the system of FIG. 6.

FIG. 7 shows a diagram illustrating some example features of the system 600 of FIG. 6. The dynamic display brightness control engine 610 may include or may be associated with an application 704, a window manager 708, a hardware user interface (HW UI) 712, a display service 716, a display manager 720, and one or more drivers 730. The display manager 720 may include or may be associated with a brightness control service 724 and the buffer 660.

The facial detection engine 670 may include a face analyzer 752, a secure database 754, and a face detection accumulator 756. The face analyzer 752 may perform facial analysis on the buffered frames 664 and may store the results of the facial analysis in the secure database 754. The face detection accumulator 756 may determine, calculate, ascertain, obtain, or select one or more display brightness values 674 based on the contents of the secure database 754.

The dynamic display brightness control engine 610 may receive the one or more display brightness values 674. The display manager 720 may receive the one or more display brightness values 674 and may input them to the brightness control service 724. Based on the one or more display brightness values 674, the brightness control service 724 may adjust the brightness of the AMOLED touchscreen display 690 to reduce power consumption when the user's face is not detected to be looking at the display, while providing an optimal viewing experience when the user's face is detected to be looking at the display.

The system 600 also may provide a user interface for configuring and monitoring the dynamic display brightness control, including displaying the facial detection results, allowing user control over the dimming aggressiveness, and providing notifications based on the display brightness status.

One or more features described herein may improve the performance and power efficiency of an electronic device that uses an AMOLED display. By adaptively adjusting the display brightness based on facial detection using the AON camera system, the system 600 can effectively reduce display power consumption when the user is not looking at the screen, while maintaining optimal brightness when the user is actively viewing the display. The gradual transitions between brightness levels and the use of user preferences and ambient light sensor readings further enhance the user experience and visual quality of the displayed content.

FIG. 7 shows a flow chart of an example process 700 that supports dynamic display brightness control based on facial detection using an AON camera system. The operations of the process 700 may be implemented by a device, such as the SoC 300, the mobile device 402, the headset device 502, or the system 600.

The dynamic display brightness control engine 610 may periodically sample frames of image data captured by the AON camera system at a first sampling frequency during a display-active state and at a second sampling frequency lower than the first sampling frequency during a display-inactive state to conserve power. The facial detection engine 670 may analyze the sampled frames to detect the presence and orientation of the user's face in relation to the AMOLED touchscreen display 690.

If the user's face is not detected to be looking at the display, the dynamic display brightness control engine 610 may lower the display brightness to a preset dimmer level or by a percentage determined based on user preferences or battery level, thereby reducing power consumption. If the user's face is subsequently detected to be looking at the display, the dynamic display brightness control engine 610 may increase the display brightness based on ambient light sensor readings to provide an optimal viewing experience.

The dynamic display brightness control engine 610 may apply gradual transitions between brightness levels to minimize visual artifacts and user distraction. The dynamic display brightness control engine 610 may also opportunistically perform facial detection and brightness adjustments during idle periods, such as display idle mode or processor idle mode, to further conserve power.

By dynamically controlling the display brightness based on facial detection using the AON camera system, the process 700 can significantly reduce display power consumption, which is often the largest contributor to overall device power consumption, while still providing an optimal viewing experience for the user when they are actively engaging with the device.

Figure 8:
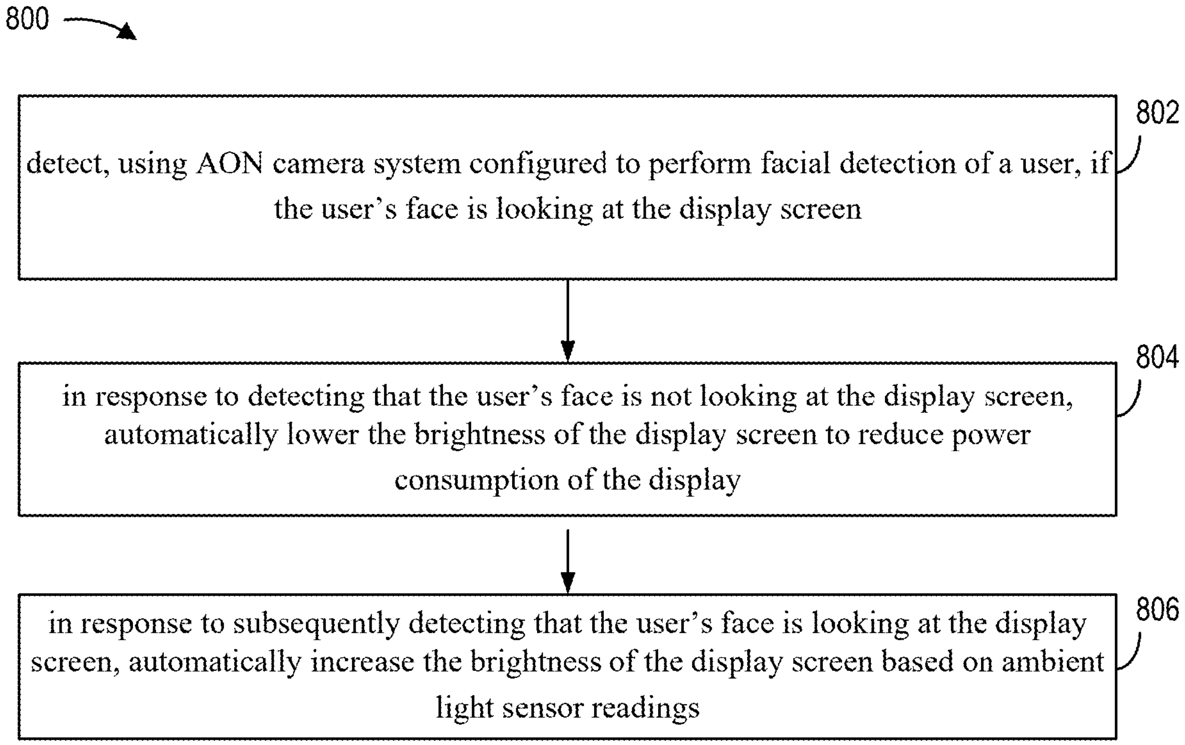
FIG. 8 is a flow chart of an example process that supports dynamic control of display screen brightness of a smartphone based on facial detection using an always-on (AON) camera system.

FIG. 8 shows a flow chart of an example process 800 that supports dynamic control of display screen brightness of a smartphone based on facial detection using an always-on (AON) camera system. The operations of the process 800 may be implemented by a device, such as the SoC 300, the mobile device 402, the headset device 502, or the system 600.

In block 802, the smartphone detects, using the AON camera system configured to perform facial detection of a user, if the user's face is looking at the display screen. The AON camera system may utilize a low-power image signal processor (ISP), such as the DSP 312 or the NSP 324, to enable the facial detection. The low-power ISP may be separate from a primary ISP used for a primary camera of the smartphone, allowing the facial detection to be performed continuously in a power-efficient manner. The AON camera system may periodically capture and analyze image frames to determine the presence and orientation of the user's face in relation to the display screen. The facial detection may be performed at a first periodic interval when the smartphone is in a display-active state and at a second periodic interval longer than the first periodic interval when the smartphone is in a display-inactive state to further conserve power.

In block 804, in response to detecting that the user's face is not looking at the display screen, the smartphone automatically lowers the brightness of the display screen to reduce power consumption of the display. According to one aspect, the brightness can be lowered to a preset dimmer level or by a percentage. The preset dimmer level or percentage may be determined based on a user preference setting, a battery level of the smartphone, or a combination thereof. For example, the user may set a preference for a more aggressive dimming when the battery level is low, or a less aggressive dimming when the battery level is high. The smartphone may store a lookup table or a formula that maps the user preference setting and/or battery level to the preset dimmer level.

In some implementations, the display screen may comprise an active-matrix organic light-emitting diode (AMOLED) panel. In such cases, the power consumption of the AMOLED panel may be reduced by lowering a pixel illumination intensity when the brightness of the display screen is lowered to the preset dimmer level. The smartphone may control the pixel illumination intensity by adjusting a voltage or current supplied to the AMOLED panel, or by applying a pulse-width modulation (PWM) signal to the AMOLED panel with a duty cycle corresponding to the preset dimmer level.

In block 806, in response to subsequently detecting that the user's face is looking at the display screen, the smartphone automatically increases the brightness of the display screen based on ambient light sensor readings. The ambient light sensor may be a separate sensor or may be integrated with the AON camera system. The smartphone may read the ambient light sensor to determine an ambient light level and may adjust the display screen brightness to provide a comfortable viewing experience for the user based on the ambient light level. For example, the smartphone may set the display screen brightness to a higher level in bright ambient light conditions, and to a lower level in dark ambient light conditions.

In some implementations, the smartphone may utilize the facial detection of the AON camera system to enable instant face unlock. When the user's face is detected, the smartphone may automatically wake up from a sleep or idle state and initiate a face unlock process. The face unlock process may include capturing a higher-resolution image using the primary camera, extracting facial features from the captured image, and comparing the extracted facial features to a stored template of the user's face. If the extracted facial features match the stored template, the smartphone may unlock itself and allow the user to access its functions and content.

In some implementations, the smartphone may utilize the facial detection of the AON camera system to enable hands-free user convenience features. For example, the smartphone may automatically keep the display screen active while the user's face is detected, even if the user is not actively interacting with the smartphone. This may allow the user to easily glance at the display screen to check notifications, time, or other information without having to manually wake up the smartphone.

In some implementations, the smartphone may utilize the facial detection of the AON camera system to enhance device security. For example, the smartphone may automatically lock itself or notify the user when an unauthorized face is detected. The smartphone may compare the detected face to a list of authorized faces stored in its memory, and if the detected face does not match any of the authorized faces, the smartphone may take appropriate security measures. The security measures may include locking the smartphone, sounding an alarm, capturing an image of the unauthorized face, or sending a notification to the user's email or cloud account.

By dynamically controlling the display screen brightness based on facial detection using the AON camera system, the process 800 can significantly reduce the display power consumption of the smartphone, which is often the largest contributor to the overall power consumption. At the same time, the process 800 can provide a convenient and secure user experience by automatically adjusting the display screen brightness based on the user's viewing state and ambient light conditions, enabling instant face unlock and hands-free convenience features, and enhancing device security against unauthorized access.

Figure 9:
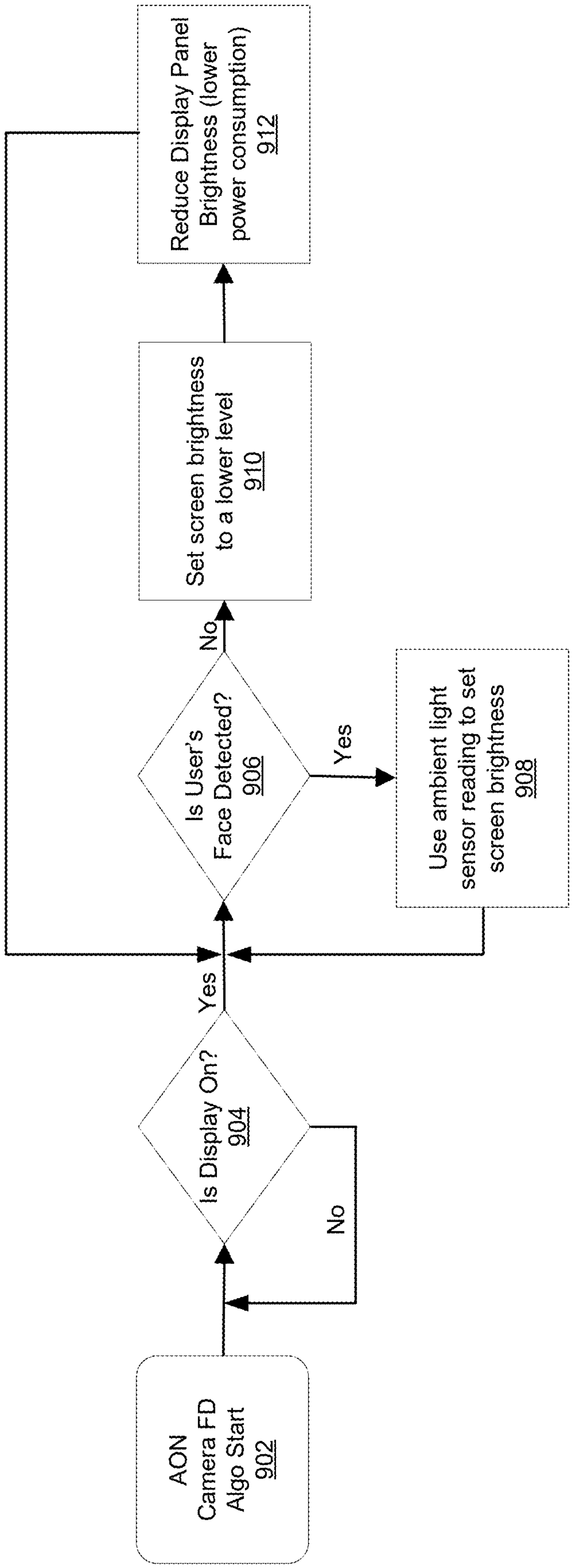
FIG. 9 is a flow chart of an example method that supports dynamic control of display screen brightness based on facial detection using an always-on (AON) camera system according to aspects of this disclosure.

FIG. 9 shows a flow chart of an example method 900 that supports dynamic control of display screen brightness based on facial detection using an always-on (AON) camera system according to aspects of this disclosure.

At block 902, the AON camera facial detection process is initiated. Here, the system can perform facial detection to determine if the user's face is looking at the display screen. The AON camera system can utilize a low-power image signal processor (ISP), separate from the primary ISP used for the main camera, to enable continuous facial detection in a power-efficient manner.

At block 904, method 900 determines if the display is on. If the display is on (i.e., "Yes" path from block 904), method 900 proceeds to block 906. If the device is not on (i.e., "No" path from block 904), method 900 returns to step 902.

At block 906, method 900 determines if the user's face is detected by the AON camera system. If the user's face is detected (i.e., "Yes" path from block 906), method 900 proceeds to block 908. If the user's face is not detected (i.e., "No" path from block 904), method 900 proceeds to block 910.

At block 908, in response to determining that the user's face is detected, method 900 automatically sets the display screen brightness based on ambient light sensor readings to provide an optimal viewing experience for the user.

At block 910, in response to determining that the user's face is not detected, method 900 automatically lowers the brightness of the display screen to reduce power consumption of the display. According to one aspect, the brightness can be lowered to a preset dimmer level or by a percentage. The preset dimmer level or percentage may be determined based on a user preference setting, a battery level of the device, or a combination thereof.

At block 912, method 900 intelligently reduces the display panel brightness to reduce power consumption. Similar to the above discussion, here the dimmer level can be determined based on various factors, such as user preference settings, a battery level of the device, or a combination of both.

In some implementations, the power consumption of an AMOLED panel can be further optimized by lowering the pixel illumination intensity when the display brightness is reduced. This can be achieved by controlling the voltage or current supplied to the AMOLED panel or by applying a pulse-width modulation (PWM) signal with a reduced duty cycle.

The extent of the brightness reduction can be customized based on user preferences and device characteristics. For example, users may have the option to set different dimming levels for various battery level thresholds, allowing for more aggressive power-saving measures when the battery is running low.

By implementing this dynamic display brightness control based on user engagement detected by the AON camera system, method 900 significantly reduces the overall power consumption of the device, leading to extended battery life without compromising the user experience during active use.

According to one aspect, method 900 utilizes the facial detection of the AON camera system to enable instant face unlock. When the user's face is detected, the device automatically wakes up from a sleep or idle state and initiates a face unlock process. According to another aspect, method 900 utilizes the facial detection of the AON camera system to enable hands-free user convenience features. For example, the device may automatically keep the display screen active while the user's face is detected, allowing the user to easily glance at the screen without having to manually wake up the device. According to another aspect, method 900 utilizes the facial detection of the AON camera system to enhance device security. The device may automatically lock itself or notify the user when an unauthorized face is detected.

In some implementations, the AON camera system may perform the facial detection at different periodic intervals based on the display state to further conserve power. For example, the AON camera system may perform facial detection at a first periodic interval (e.g., every 0.5 seconds) when the device is in a display-active state and at a second periodic interval longer than the first periodic interval (e.g., every 2 seconds) when the device is in a display-inactive state.

Method 900 dynamically adjusts the display screen brightness based on user engagement detected by the AON camera system, enabling significant power savings without compromising the user experience during active use of the device. Additionally, method 900 leverages the AON camera system to provide enhanced user convenience and security features, such as instant face unlock, hands-free operation, and protection against unauthorized access.

Figure 10:
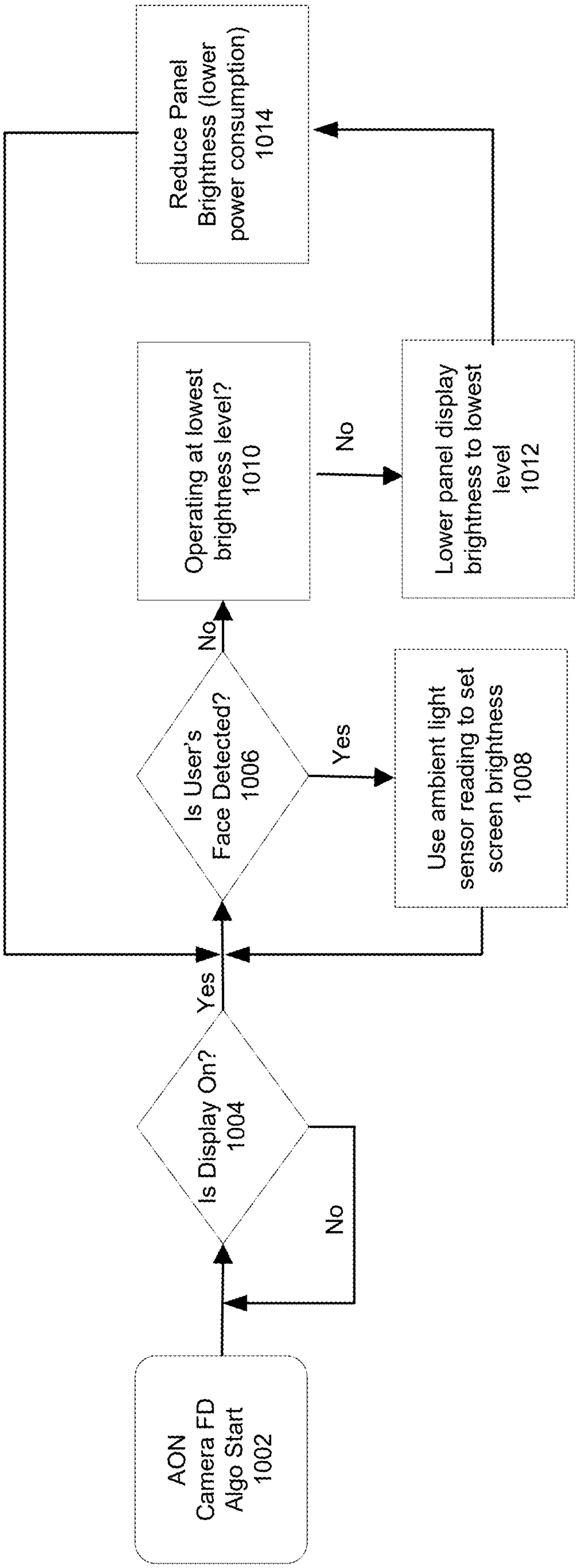
FIG. 10 is a flow chart of another example method that supports dynamic control of display screen brightness based on facial detection using an always-on (AON) camera system according to aspects of this disclosure.

FIG. 10 shows a flow chart of another example method 1000 that supports dynamic control of display screen brightness based on facial detection using an always-on (AON) camera system according to aspects of this disclosure. Method 1000 can also utilize facial detection for instant face unlock, hands-free user convenience features, enhanced device security, and performing facial detection at different periodic intervals based on the display state.

At block 1002, the AON camera facial detection process is initiated. Here, the system can perform facial detection to determine if the user's face is looking at the display screen. The AON camera system can utilize a low-power image signal processor (ISP), separate from the primary ISP used for the main camera, to enable continuous facial detection in a power-efficient manner.

At block 1004, method 1000 determines if the display is on. If the display is on (i.e., "Yes" path from block 1004), method 1000 proceeds to block 1006. If the device is not on (i.e., "No" path from block 1004), method 1000 returns to step 1002.

At block 1006, method 1000 determines if the user's face is detected by the AON camera system. If the user's face is detected (i.e., "Yes" path from block 1006), method 1000 proceeds to block 1008. If the user's face is not detected (i.e., "No" path from block 1006), method 1000 proceeds to block 1010.

At block 1008, in response to determining that the user's face is detected, method 1000 automatically sets the display screen brightness based on ambient light sensor readings to provide an optimal viewing experience for the user.

At block 1010, in response to determining that the user's face is not detected, method 1000 determines if the display is operating at the lowest possible brightness level. If the display is operating at the lowest possible brightness level (i.e., "Yes" path from block 1010), no action is taken and method 1000 can return to block 1006. If the display is not operating at the lowest possible brightness level (i.e., "No" path from block 1010), method 1000 proceeds to block 1012.

At block 1012, based on a determination that the display not operating at the lowest possible brightness level, method 1000 lowers the screen brightness by a pre-set percentage. As discussed herein, the percentage can be determined based on a user preference setting, a battery level of the smartphone, or a combination thereof At block 1014, method 1000 intelligently reduces the display panel brightness to reduce power consumption of the smart device in accordance with the determinations made at blocks 1002-1012.

Aspects of this disclosure are directed to certain implementations; however, the teachings herein can be applied in a multitude of different ways to different devices. The described implementations may be implemented in any device that is configured to display an image, whether in motion (such as video) or stationary (such as still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (such as e-readers), computer monitors, auto displays (such as odometer display, etc.), cockpit controls or displays, camera view displays (such as display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as MEMS and non-MEMS), aesthetic structures (such as display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

In a first aspect, a method includes detecting, using an AON camera system configured to perform facial detection of a user, if the user's face is looking at the display screen. The method further includes, in response to detecting that the user's face is not looking at the display screen, automatically lowering the brightness of the display screen to reduce power consumption of the display. The method further includes, in response to subsequently detecting that the user's face is looking at the display screen, automatically increasing the brightness of the display screen based on ambient light sensor readings.

In a second aspect, in combination with the first aspect, automatically lowering the brightness of the display screen comprises lowering the brightness to a preset dimmer level, wherein the preset dimmer level is determined based on a user preference setting, a battery level of the smartphone, or a combination thereof.

In a third aspect, in combination with any of the first aspect and second aspects, automatically lowering the brightness of the display screen comprises lowering the brightness by a percentage, wherein the percentage is determined based on a user preference setting, a battery level of the smartphone, or a combination thereof.

In a fourth aspect, in combination with any of the first aspect through third aspects, the method further includes utilizing the facial detection of the AON camera system to enable instant face unlock by automatically waking the smartphone and initiating a face unlock process when the user's face is detected, utilizing the facial detection of the AON camera system to enable hands-free user convenience features by automatically keeping the display screen active while the user's face is detected, and utilizing the facial detection of the AON camera system to enhance device security by locking the smartphone or notifying the user when an unauthorized face is detected.

In a fifth aspect, in combination with any of the first aspect through fourth aspects, the display screen comprises an active-matrix organic light-emitting diode (AMOLED) panel, and the power consumption of the AMOLED panel is reduced by lowering a pixel illumination intensity when the brightness of the display screen is lowered to the preset dimmer level.

In a sixth aspect, in combination with any of the first aspect through fifth aspects, the AON camera system performs the facial detection of the user at a first periodic interval when the smartphone is in a display-active state and at a second periodic interval longer than the first periodic interval when the smartphone is in a display-inactive state to further conserve power.

In a seventh aspect, an apparatus includes a processing system that includes processor circuitry and memory circuitry that stores code. The processing system is configured to cause the apparatus to detect, using an AON camera system configured to perform facial detection of a user, if the user's face is looking at a display screen. The processing system is further configured to, in response to detecting that the user's face is not looking at the display screen, automatically lower the brightness of the display screen to a preset dimmer level to reduce power consumption of the display. The processing system is further configured to, in response to subsequently detecting that the user's face is looking at the display screen, automatically increase the brightness of the display screen based on ambient light sensor readings.

In an eighth aspect, in combination with the seventh aspect, the preset dimmer level is determined based on a user preference setting, a battery level of the apparatus, or a combination thereof.

In a ninth aspect, in combination with any of the seventh aspect through eighth aspects, the AON camera system utilizes a low-power image signal processor (ISP) to enable the facial detection, and the low-power ISP is separate from a primary ISP used for a primary camera of the apparatus.

In a tenth aspect, in combination with any of the seventh aspect through ninth aspects, the processing system is further configured to cause the apparatus to utilize the facial detection of the AON camera system to enable instant face unlock by automatically waking the apparatus and initiating a face unlock process when the user's face is detected, utilize the facial detection of the AON camera system to enable hands-free user convenience features by automatically keeping the display screen active while the user's face is detected, and utilize the facial detection of the AON camera system to enhance device security by locking the apparatus or notifying the user when an unauthorized face is detected.

In an eleventh aspect, in combination with any of the seventh aspect through tenth aspects, the display screen comprises an active-matrix organic light-emitting diode (AMOLED) panel, and the power consumption of the AMOLED panel is reduced by lowering a pixel illumination intensity when the brightness of the display screen is lowered to the preset dimmer level.

In a twelfth aspect, in combination with any of the seventh aspect through eleventh aspects, the AON camera system performs the facial detection of the user at a first periodic interval when the apparatus is in a display-active state and at a second periodic interval longer than the first periodic interval when the apparatus is in a display-inactive state to further conserve power.

In a thirteenth aspect, a multimedia device includes a display and a processing system that includes processor circuitry and memory circuitry that stores code. The processing system is configured to cause the multimedia device to detect, using an AON camera system configured to perform facial detection of a user, if the user's face is looking at the display. The processing system is further configured to, in response to detecting that the user's face is not looking at the display, automatically lower the brightness of the display to a preset dimmer level to reduce power consumption of the display. The processing system is further configured to, in response to subsequently detecting that the user's face is looking at the display, automatically increase the brightness of the display based on ambient light sensor readings.

In a fourteenth aspect, in combination with the thirteenth aspect, the preset dimmer level is determined based on a user preference setting, a battery level of the multimedia device, or a combination thereof.

In a fifteenth aspect, in combination with any of the thirteenth aspect through fourteenth aspects, the AON camera system utilizes a low-power image signal processor (ISP) to enable the facial detection, and the low-power ISP is separate from a primary ISP used for a primary camera of the multimedia device.

In a sixteenth aspect, in combination with any of the thirteenth aspect through fifteenth aspects, the processing system is further configured to cause the multimedia device to utilize the facial detection of the AON camera system to enable instant face unlock by automatically waking the multimedia device and initiating a face unlock process when the user's face is detected, utilize the facial detection of the AON camera system to enable hands-free user convenience features by automatically keeping the display active while the user's face is detected, and utilize the facial detection of the AON camera system to enhance device security by locking the multimedia device or notifying the user when an unauthorized face is detected.

In a seventeenth aspect, in combination with any of the thirteenth aspect through sixteenth aspects, the display comprises an active-matrix organic light-emitting diode (AMOLED) panel, and the power consumption of the AMOLED panel is reduced by lowering a pixel illumination intensity when the brightness of the display is lowered to the preset dimmer level.

In an eighteenth aspect, in combination with any of the thirteenth aspect through seventeenth aspects, the AON camera system performs the facial detection of the user at a first periodic interval when the multimedia device is in a display-active state and at a second periodic interval longer than the first periodic interval when the multimedia device is in a display-inactive state to further conserve power. In the figures, a single block may be described as performing a function or functions. The function or functions performed by that block may be performed in a single component or across multiple components, or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure. Also, the example devices may include components other than those shown, including well-known components such as a processor, memory, and the like.

In an nineteenth aspect, in combination with any of the thirteenth aspect through seventeenth aspects, the AON camera system the AON camera system utilizes a low-power image signal processor (ISP) to enable the facial detection, and the low-power ISP is separate from a primary ISP used for a primary camera of the smartphone.

In an nineteenth aspect, in combination with any of the seventh aspect through twelfth aspects, the AON camera system the AON camera system utilizes a low-power image signal processor (ISP) to enable the facial detection, and the low-power ISP is separate from a primary ISP used for a primary camera of the smartphone.

As used herein, the term "determine" or "selecting" encompasses a wide variety of actions and, therefore, "selecting" can include calculating, computing, processing, deriving, estimating, investigating, looking up (such as via looking up in a table, a database, or another data structure), inferring, ascertaining, or measuring, among other possibilities. Also, "selecting" can include receiving (such as receiving information), accessing (such as accessing data stored in memory) or transmitting (such as transmitting information), among other possibilities. Additionally, "selecting" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Further, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram.

However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A method for dynamic control of display screen brightness of a smartphone, the method comprising:

detecting an idle mode trigger condition;

detecting, using an always-on (AON) camera system configured to perform facial detection of a user, if the user's face is looking at the display screen based on the idle mode trigger condition;

in response to detecting that the user's face is not looking at the display screen, automatically lowering the brightness of the display screen to a preset dimmer level that is based on a battery level of the smartphone; and in response to subsequently detecting that the user's face is looking at the display screen, automatically increasing the brightness of the display screen based on ambient light sensor readings, wherein automatically lowering the brightness to the preset dimmer level or automatically increasing the brightness based on the ambient light sensor reading are each based on a type of power supply providing energy to the smartphone and whether the user's face is looking at the display screen.

2. The method of claim 1, wherein the preset dimmer level is determined based on a user preference setting.

3. The method of claim 1, wherein automatically lowering the brightness of the display screen comprises lowering the brightness by a percentage, wherein the percentage is determined based on a user preference setting, the battery level of the smartphone, or a combination thereof.

4. The method of claim 1, further comprising:

utilizing the facial detection of the AON camera system to enable instant face unlock by automatically waking the smartphone and initiating a face unlock process when the user's face is detected;

utilizing the facial detection of the AON camera system to enable hands-free user convenience features by automatically keeping the display screen active while the user's face is detected; and utilizing the facial detection of the AON camera system to enhance device security by locking the smartphone or notifying the user when an unauthorized face is detected.

5. The method of claim 1, wherein the display screen comprises an active-matrix organic light-emitting diode (AMOLED) panel, and wherein a power consumption of the AMOLED panel is reduced by lowering a pixel illumination intensity when the brightness of the display screen is lowered to the preset dimmer level.

6. The method of claim 1, wherein the AON camera system performs the facial detection of the user at a first periodic interval when the smartphone is in a display-active state and at a second periodic interval longer than the first periodic interval when the smartphone is in a display-inactive state to further conserve power.

7. The method of claim 1, wherein the AON camera system utilizes a low-power image signal processor (ISP) to enable the facial detection, and wherein the low-power ISP is separate from a primary ISP used for a primary camera of the smartphone.

8. An apparatus, comprising:

a processing system that includes processor circuitry and memory circuitry that stores code, the processing system configured to cause the apparatus to:

detect an idle mode trigger condition;

detect, using an always-on (AON) camera system configured to perform facial detection of a user, if the user's face is looking at a display screen based on the idle mode trigger condition;

in response to detecting that the user's face is not looking at the display screen, automatically lower the brightness of the display screen to a preset dimmer level that is based on a battery level of a smartphone; and in response to subsequently detecting that the user's face is looking at the display screen, automatically increase the brightness of the display screen based on ambient light sensor readings, wherein automatically lowering the brightness to the preset dimmer level or automatically increasing the brightness based on the ambient light sensor reading are each based on a type of power supply providing energy to the smartphone and whether the user's face is looking at the display screen.

9. The apparatus of claim 8, wherein the preset dimmer level is determined based on a user preference setting.

10. The apparatus of claim 8, wherein automatically lowering the brightness of the display screen comprises lowering the brightness by a percentage, wherein the percentage is determined based on a user preference setting, the battery level of the smartphone, or a combination thereof.

11. The apparatus of claim 8, wherein the processing system is further configured to cause the apparatus to:

utilize the facial detection of the AON camera system to enable instant face unlock by automatically waking the apparatus and initiating a face unlock process when the user's face is detected;

utilize the facial detection of the AON camera system to enable hands-free user convenience features by automatically keeping the display screen active while the user's face is detected; and utilize the facial detection of the AON camera system to enhance device security by locking the apparatus or notifying the user when an unauthorized face is detected.

12. The apparatus of claim 8, wherein the display screen comprises an active-matrix organic light-emitting diode (AMOLED) panel, and wherein a power consumption of the AMOLED panel is reduced by lowering a pixel illumination intensity when the brightness of the display screen is lowered to the preset dimmer level.

13. The apparatus of claim 8, wherein the AON camera system performs the facial detection of the user at a first periodic interval when the apparatus is in a display-active state and at a second periodic interval longer than the first periodic interval when the apparatus is in a display-inactive state to further conserve power.

14. A multimedia device, comprising:

a display; and a processing system that includes processor circuitry and memory circuitry that stores code, the processing system configured to cause the multimedia device to:

detect an idle mode trigger condition;

detect, using an always-on (AON) camera system configured to perform facial detection of a user, if the user's face is looking at the display screen based on the idle mode trigger condition;

in response to detecting that the user's face is not looking at the display, automatically lower the brightness of the display to a preset dimmer level that is based on a battery level of a smartphone; and in response to subsequently detecting that the user's face is looking at the display, automatically increase the brightness of the display based on ambient light sensor readings, wherein automatically lowering the brightness to the preset dimmer level or automatically increasing the brightness based on the ambient light sensor reading are each based on a type of power supply providing energy to the smartphone and whether the user's face is looking at the display screen.

15. The multimedia device of claim 14, wherein the preset dimmer level is determined based on a user preference setting.

16. The multimedia device of claim 14, wherein automatically lowering the brightness of the display screen comprises lowering the brightness by a percentage, wherein the percentage is determined based on a user preference setting, the battery level of the smartphone, or a combination thereof.

17. The multimedia device of claim 14, wherein the processing system is further configured to cause the multimedia device to:

utilize the facial detection of the AON camera system to enable instant face unlock by automatically waking the multimedia device and initiating a face unlock process when the user's face is detected;

utilize the facial detection of the AON camera system to enable hands-free user convenience features by automatically keeping the display active while the user's face is detected; and utilize the facial detection of the AON camera system to enhance device security by locking the multimedia device or notifying the user when an unauthorized face is detected.

18. The multimedia device of claim 14, wherein the display comprises an active-matrix organic light-emitting diode (AMOLED) panel, and wherein a power consumption of the AMOLED panel is reduced by lowering a pixel illumination intensity when the brightness of the display is lowered to the preset dimmer level.

* * * * *